US008300023B2

(12) United States Patent  (10) Patent No.: US 8,300,023 B2
Forutanpour et al.  (45) Date of Patent: Oct. 30, 2012

(54) VIRTUAL KEYPAD GENERATOR WITH LEARNING CAPABILITIES

(75) Inventors: Babak Forutanpour, Carlsbad, CA (US); Kurt W. Abrahamson, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 647 days.

(21) Appl. No.: 12/422,077

(22) Filed: Apr. 10, 2009

(65) Prior Publication Data

US 2010/0259561 A1    Oct. 14, 2010

(51) Int. Cl.
G06F 3/041    (2006.01)
(52) U.S. Cl. .................. 345/173; 178/18.01; 345/168
(58) Field of Classification Search .......... 345/168–172, 345/173–178; 178/18.01–18.09, 18.11, 20.01; 715/700, 866, 762, 764, 765, 771–773
See application file for complete search history.

(56) References Cited

U.S. PATENT DOCUMENTS

| | | | |
|---|---|---|---|
| 5,128,672 A | 7/1992 | Kaehler | |
| 5,581,484 A * | 12/1996 | Prince ........................... | 702/150 |
| 5,615,384 A | 3/1997 | Allard | |
| 5,828,360 A | 10/1998 | Anderson et al. | |
| 5,914,481 A | 6/1999 | Danielson | |
| 5,996,080 A | 11/1999 | Silva et al. | |
| 6,011,542 A | 1/2000 | Durrani et al. | |
| 6,335,725 B1 | 1/2002 | Koh et al. | |
| 6,580,442 B1 | 6/2003 | Singh et al. | |
| 6,720,951 B2 * | 4/2004 | Taguchi ........................ | 345/172 |
| 6,918,091 B2 | 7/2005 | Leavitt et al. | |
| 2005/0024344 A1 | 2/2005 | Trachte | |
| 2005/0162402 A1 | 7/2005 | Watanachote | |
| 2005/0206730 A1 | 9/2005 | Hagiwara | |
| 2005/0225538 A1 | 10/2005 | Verhaegh | |
| 2006/0028450 A1 | 2/2006 | Suraqui | |
| 2006/0077179 A1 | 4/2006 | Hsu et al. | |
| 2006/0274051 A1 | 12/2006 | Longe et al. | |
| 2007/0089164 A1 * | 4/2007 | Gao et al. .......................... | 726/4 |
| 2009/0066659 A1 * | 3/2009 | He et al. ........................ | 345/173 |

FOREIGN PATENT DOCUMENTS

| | | |
|---|---|---|
| EP | 0272884 | 6/1988 |
| EP | 0412308 | 8/1991 |
| EP | 0498082 | 12/1992 |
| EP | 0924915 | 6/1999 |
| EP | 1255187 | 11/2002 |
| GB | 2380583 | 4/2003 |
| JP | 2008242958 | 10/2008 |
| WO | 03021922 | 3/2003 |

OTHER PUBLICATIONS

International Search Report, PCT/GB03/000158, International Search Authority EPO, Mar. 8, 2004. International Search Report and Written Opinion—PCT/US09/043433, International Search Authority—European Patent Office, Apr. 29, 2010.

* cited by examiner

Primary Examiner — Stephen Sherman
(74) Attorney, Agent, or Firm — Nicholas A. Cole; James T. Hagler

(57) ABSTRACT

Methods and systems enable defining customized virtual keyboards on a touch sensitive surface, such as a touchscreen. Using learning algorithms, a computing device may learn the typing patterns of a user and "morph" the keys of a virtual keyboard into locations, sizes, and orientations that are comfortable for the user and which may reduce typing errors. A user may create a custom keypad layout by performing a series of key strokes on a touch sensitive surface. The computing device may correlate the touch locations to particular keys and generate keypad layout data that can be used to display the virtual keyboard and interpret touches on the touch sensitive surface. The computing device may monitor user typing activity and refine the keypad layout data based on detected or corrected typing errors. Keypad layout data may be exported to other devices to enable users to take their virtual keyboards with them.

49 Claims, 17 Drawing Sheets

| Index | Instruction | Expected Keystrokes |
|---|---|---|
| 0 | Place Hands Over ASDF And JKL; Keys, And Each Thumb Over Where He Would Like Space Keys To Be. | |
| 1 | Squash And Stretch ASDF And JKL; Fingers To Resize Keyboard. Move Keys As Desired. | A S D F J K L ; |
| 2 | Type The Displayed Phrase. | The quick brown fox jumped over the lazy dog's back. |
| 3 | Type The Displayed Phrase. | Now is the time for all good men to come to aid of their country. |

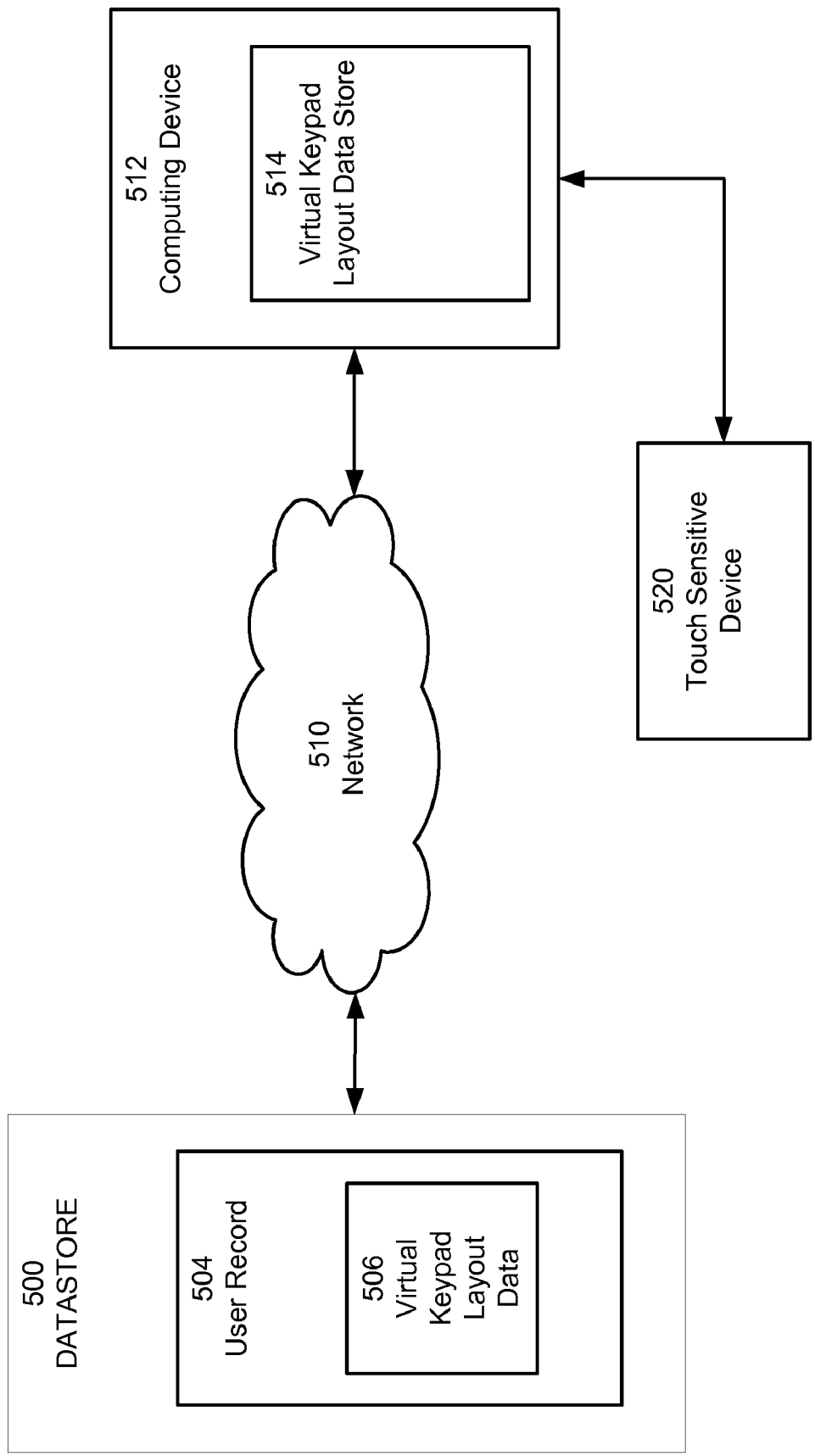

VIRTUAL KEYPAD GENERATOR WITH LEARNING CAPABILITIES

FIELD OF THE INVENTION

The present invention relates generally to computer user input devices, and more particularly to a learning data entry device.

BACKGROUND

The demand for computing devices that are powerful yet portable, compact yet fully featured is ever increasing. This trend is particularly evident in the evolution of mobile electronic devices (mobile devices), such as cellular telephones, that now function as telephones, video and audio capture devices, video and audio players, web access terminals, and computers.

As mobile devices grow in sophistication, the variety and sophistication of application software is increasing, thereby turning mobile devices into multipurpose productivity tools. Yet, the usefulness of mobile devices and their applications are limited by the small area available for the user-interface. Traditional cellular telephones, for example, include a simple keypad of fixed configuration. Recently, mobile devices have been released featuring miniature QWERTY keyboards, touch sensitive screen interfaces, and reconfigurable keys.

Traditionally, keypads function by transforming the depression of a key into an electrical signal that can be interpreted by the mobile device and its application software. FIG. 1 illustrates a hardware/software architecture of a typical mobile device showing one way that key press events may be communicated to application software. The pressing of a key on a traditional fixed keypad 5 closes a circuit or changes a capacitance or resistance that results in an electrical signal that can be processed by a hardware driver 4. The hardware driver 4 may be circuitry, software or a mixture of hardware and software depending upon the particular mobile device. The hardware driver 4 converts the electrical signal received from the keypad 5 into a format that can be interpreted by a software application running on the mobile device. This signal may be in the form of an interrupt or stored value in a memory table which is accessible by application software. Such an interrupt or stored value in memory may be received by a runtime environment software layer 3. The purpose of the runtime environment software layer 3 is to provide a common interface between application software and the mobile device. Thus, key press event signals are passed on to the application layer 2 in the form of a key press event message. The application software must be able to understand the meaning of the key press event, and therefore must be written to accommodate the underlying hardware driver 4 and keypad hardware 5. Key press events may also be communicated to a user-interface layer 1 such as to display the value associated with a particular key.

The layout of most keypads is established using a "one-size fits all" approach. That is, the keypad is defined by physical structures or is constrained to fit the size of a display. A standardized keypad may not be ideal for all users or all computing devices.

SUMMARY

Various aspect systems and methods provide virtual keypads on touch sensitive surface that automatically adjusts the keypad for particular users by learning user's typing patterns from the user's inputs.

In an aspect a method for defining a keypad on a touch sensitive surface includes receiving a series of coordinates of a series of user touches on the touch sensitive surface, correlating a plurality of keys with the series of received coordinates, determining an average of received coordinates correlated with each of the plurality of keys, saving the determined average coordinates for each of the plurality of keys in keypad layout data, and generating an image of a virtual keypad using the keypad layout data. The method may further include prompting the user to enter a series of keystrokes when correlating a plurality of keys with the series of received coordinates includes correlating the prompted series of keystrokes with the received coordinates. The method may further include determining a statistical envelope based upon received coordinates for each of the plurality of keys, and saving the statistical envelope for each of the plurality of keys in the keypad layout data. Generating an image of the virtual keypad using the keypad layout data may include generating images of keys in the virtual keypad in locations based upon the average coordinates of each of the plurality of keys stored in the keypad layout data. Generating an image of the virtual keypad using the keypad layout data may further include generating images of the plurality of keys in the virtual keypad in which the size of each key image is based upon the statistical envelope for each of the plurality of keys in the keypad layout data. The method may further include monitoring typing on the virtual keypad on the touch sensitive surface, identifying an adjacent key typing error, determining a correct key associated with the adjacent key typing error, updating the average coordinate for the correct key based upon received coordinates for the typed keystroke, and saving the updated average coordinate with the correct key in the keypad layout data. Identifying an adjacent key typing error may include recognizing a misspelled word, and determining whether the misspelling involves a switch of two keys that are adjacent to each other in the virtual keyboard. Identifying an adjacent key typing error may include recognizing a user correction of a letter associated with a key, and determining whether the user correction involves a switch of two keys that are adjacent to each other in the virtual keyboard. The keypad layout data may be saved in a network accessible database, and the method may further include transmitting the keypad layout data to a computing device via the network, when generating an image of a virtual keypad using the keypad layout data includes generating the image of the virtual keypad on a touch sensitive surface coupled to the computing device. The method may further include receiving a user touch on the touch sensitive surface coupled to the computing device, and determining a location on the touch sensitive surface for display of the virtual keypad based upon the received user touch on the touch sensitive surface, in which generating an image of a virtual keypad using the keypad layout data includes generating the image at the determined location on the touch sensitive surface for display.

In another aspect, a computing device includes a processor, memory coupled to the processor, and a touch sensitive surface coupled to the processor which is configured with processor-executable instructions to perform processes including receiving a series of coordinates of a series of user touches on the touch sensitive surface, correlating a plurality of keys with the series of received coordinates, determining an average of received coordinates correlated with each of the plurality of keys, saving the determined average coordinates for each of the plurality of keys in keypad layout data, and generating an image of a virtual keypad using the keypad layout data. The computing device processor may be configured to perform processes further including prompting the user to enter a series of keystrokes, and correlating a plurality of keys with the series of received coordinates may include correlating the prompted series of keystrokes with the received coordinates. The computing device processor may be configured to perform processes further including determining a statistical envelope based upon received coordinates for each of the plurality of keys, and saving the statistical envelope for each of the plurality of keys in the keypad layout data.

The computing device processor may be configured with processor-executable instructions such that generating an image of the virtual keypad using the keypad layout data includes generating images of keys in the virtual keypad in locations based upon the average coordinates of each of the plurality of keys stored in the keypad layout data. The computing device processor may be configured with processor-executable instructions such that generating an image of the virtual keypad using the keypad layout data further includes generating images of the plurality of keys in the virtual keypad in which the size of each key image is based upon the statistical envelope for each of the plurality of keys in the keypad layout data. The computing device processor may be configured to perform processes further including monitoring typing on the virtual keypad on the touch sensitive surface, identifying an adjacent key typing error, determining a correct key associated with the adjacent key typing error, updating the average coordinate for the correct key based upon received coordinates for the typed keystroke, and saving the updated average coordinate with the correct key in the keypad layout data. The computing device processor may be configured with processor-executable instructions such that identifying an adjacent key typing error includes recognizing a misspelled word, and determining whether the misspelling involves a switch of two keys that are adjacent to each other in the virtual keyboard. The computing device processor may be configured with processor-executable instructions such that identifying an adjacent key typing error includes recognizing a user correction of a letter associated with a key, and determining whether the user correction involves a switch of two keys that are adjacent to each other in the virtual keyboard. The keypad layout data may be saved in a network accessible database and the computing device processor may be configured with processor-executable instructions to perform further processes including receiving the keypad layout data from the network accessible database via the network. The computing device processor may be configured with processor-executable instructions to perform further processes including receiving a user touch on the touch sensitive surface coupled to the computing device, determining a location on the touch sensitive surface for display of the virtual keypad based upon the received user touch on the touch sensitive surface, and generating the image of the virtual keypad using the keypad layout data at the determined location on the touch sensitive surface for display.

In another aspect, a computing device coupled to a touch sensitive surface may include a means for receiving a series of coordinates of a series of user touches on the touch sensitive surface, a means for correlating a plurality of keys with the series of received coordinates, a means for determining an average of received coordinates correlated with each of the plurality of keys, a means for saving the determined average coordinates for each of the plurality of keys in keypad layout data, and a means for generating an image of a virtual keypad using the keypad layout data.

The computing device may further include a means for prompting the user to enter a series of keystrokes, wherein the means for correlating a plurality of keys with the series of received coordinates includes a means for correlating the prompted series of keystrokes with the received coordinates. The computing device may further include a means for determining a statistical envelope based upon received coordinates for each of the plurality of keys, and a means for saving the statistical envelope for each of the plurality of keys in the keypad layout data. The means for generating an image of the virtual keypad using the keypad layout data may include a means for generating images of keys in the virtual keypad in locations based upon the average coordinates of each of the plurality of keys stored in the keypad layout data. The means for generating an image of the virtual keypad using the keypad layout data may further include a means for generating images of the plurality of keys in the virtual keypad in which the size of each key image is based upon the statistical envelope for each of the plurality of keys in the keypad layout data. The computing device may further include a means for monitoring typing on the virtual keypad on the touch sensitive surface, a means for identifying an adjacent key typing error, a means for determining a correct key associated with the adjacent key typing error, a means for updating the average coordinate for the correct key based upon received coordinates for the typed keystroke, and a means for saving the updated average coordinate with the correct key in the keypad layout data. The means for identifying an adjacent key typing error may include a means for recognizing a misspelled word, and a means for determining whether the misspelling involves a switch of two keys that are adjacent to each other in the virtual keyboard. The means for identifying an adjacent key typing error may include a means for recognizing a user correction of a letter associated with a key, and a means for determining whether the user correction involves a switch of two keys that are adjacent to each other in the virtual keyboard. The keypad layout data may be saved in a network accessible database, and the computing device may further include a means for transmitting the keypad layout data to a computing device via the network, wherein the means for generating an image of a virtual keypad using the keypad layout data may include a means for generating the image of the virtual keypad on a touch sensitive surface coupled to the computing device. The computing device may further include a means for receiving a user touch on the touch sensitive surface coupled to the computing device, a means for determining a location on the touch sensitive surface for display of the virtual keypad based upon the received user touch on the touch sensitive surface, wherein the means for generating an image of a virtual keypad using the keypad layout data may include a means for generating the image at the determined location on the touch sensitive surface for display.

In another aspect, a computer program product may include a computer-readable medium that includes at least one instruction for receiving a series of coordinates of a series of user touches on the touch sensitive surface, at least one instruction for correlating a plurality of keys with the series of received coordinates, at least one instruction for determining an average of received coordinates correlated with each of the plurality of keys, at least one instruction for saving the determined average coordinates for each of the plurality of keys in keypad layout data, and at least one instruction for generating an image of a virtual keypad using the keypad layout data. The computer-readable medium may further include at least one instruction for prompting the user to enter a series of keystrokes, wherein the at least one instruction for correlating a plurality of keys with the series of received coordinates includes at least one instruction for correlating the prompted series of keystrokes with the received coordinates. The computer-readable medium may further include at least one instruction for determining a statistical envelope based upon received coordinates for each of the plurality of keys, and at least one instruction for saving the statistical envelope for each of the plurality of keys in the keypad layout data. The at least one instruction for generating an image of the virtual keypad using the keypad layout data may include at least one instruction for generating images of keys in the virtual keypad in locations based upon the average coordinates of each of the plurality of keys stored in the keypad layout data. 35. The at least one instruction for generating an image of the virtual keypad using the keypad layout data may further include at least one instruction for generating images of the plurality of keys in the virtual keypad in which the size of each key image is based upon the statistical envelope for each of the plurality of keys in the keypad layout data. The computer-readable medium may further include at least one instruction for monitoring typing on the virtual keypad on the touch sensitive surface, at least one instruction for identifying an adjacent key typing error, at least one instruction for determining a correct key associated with the adjacent key typing error, at least one instruction for the average coordinate for the correct key based upon received coordinates for the typed keystroke, and at least one instruction for saving the updated average coordinates with the correct key in the keypad layout data. The at least one instruction for identifying an adjacent key typing error may include at least one instruction for recognizing a misspelled word, and at least one instruction for determining whether the misspelling involves a switch of two keys that are adjacent to each other in the virtual keyboard. The at least one instruction for identifying an adjacent key typing error may include at least one instruction for recognizing a user correction of a letter associated with a key, and at least one instruction for determining whether the user correction involves a switch of two keys that are adjacent to each other in the virtual keyboard. The keypad layout data may be saved in a network accessible database, and the computer-readable medium may further include at least one instruction for transmitting the keypad layout data to a computing device via the network, wherein the at least one instruction for generating an image of a virtual keypad using the keypad layout data includes at least one instruction for generating the image of the virtual keypad on a touch sensitive surface coupled to the computing device. The computer-readable medium may further include at least one instruction for receiving a user touch on the touch sensitive surface coupled to the computing device, and at least one instruction for determining a location on the touch sensitive surface for display of the virtual keypad based upon the received user touch on the touch sensitive surface, wherein the at least one instruction for generating an image of a virtual keypad using the keypad layout data includes at least one instruction for generating the image at the determined location on the touch sensitive surface for display.

In a further aspect, a method for customizing a default keypad to a user's hands may include receiving a plurality of coordinates of user touches on a touch sensitive surface, measuring a dimension of the user's hands based upon at least a portion of the received plurality of coordinates of user touches, adjusting layout dimensions of a default keypad layout based upon the measured dimension of the user's hands, and generating an image of a virtual keypad using the adjusted layout dimensions of the default keypad layout.

In a further aspect, a computing device includes a processor, memory coupled to the processor, and a touch sensitive surface coupled to the processor, in which the processor is configured with processor-executable instructions to perform processes including receiving a plurality of coordinates of user touches on the touch sensitive surface, measuring a dimension of the user's hands based upon at least a portion of the received plurality of coordinates of user touches, adjusting layout dimensions of a default keypad layout based upon the measured dimension of the user's hands, and generating an image of a virtual keypad using the adjusted layout dimensions of the default keypad layout.

In a further aspect, a computing device, includes a means for receiving a plurality of coordinates of user touches on a touch sensitive surface, a means for measuring a dimension of the user's hands based upon at least a portion of the received plurality of coordinates of user touches, a means for adjusting layout dimensions of a default keypad layout based upon the measured dimension of the user's hands, and a means for generating an image of a virtual keypad using the adjusted layout dimensions of the default keypad layout.

In a further aspect, a computer program product includes a computer-readable medium that includes at least one instruction for receiving a plurality of coordinates of user touches on a touch sensitive surface, at least one instruction for measuring a dimension of the user's hands based upon at least a portion of the received plurality of coordinates of user touches, at least one instruction for adjusting layout dimensions of a default keypad layout based upon the measured dimension of the user's hands, and at least one instruction for generating an image of a virtual keypad using the adjusted layout dimensions of the default keypad layout.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 5 is a data structure of an instruction table suitable for use in an aspect.

FIG. 11 is a communication network block diagram illustrating a network architecture according an aspect.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 13:
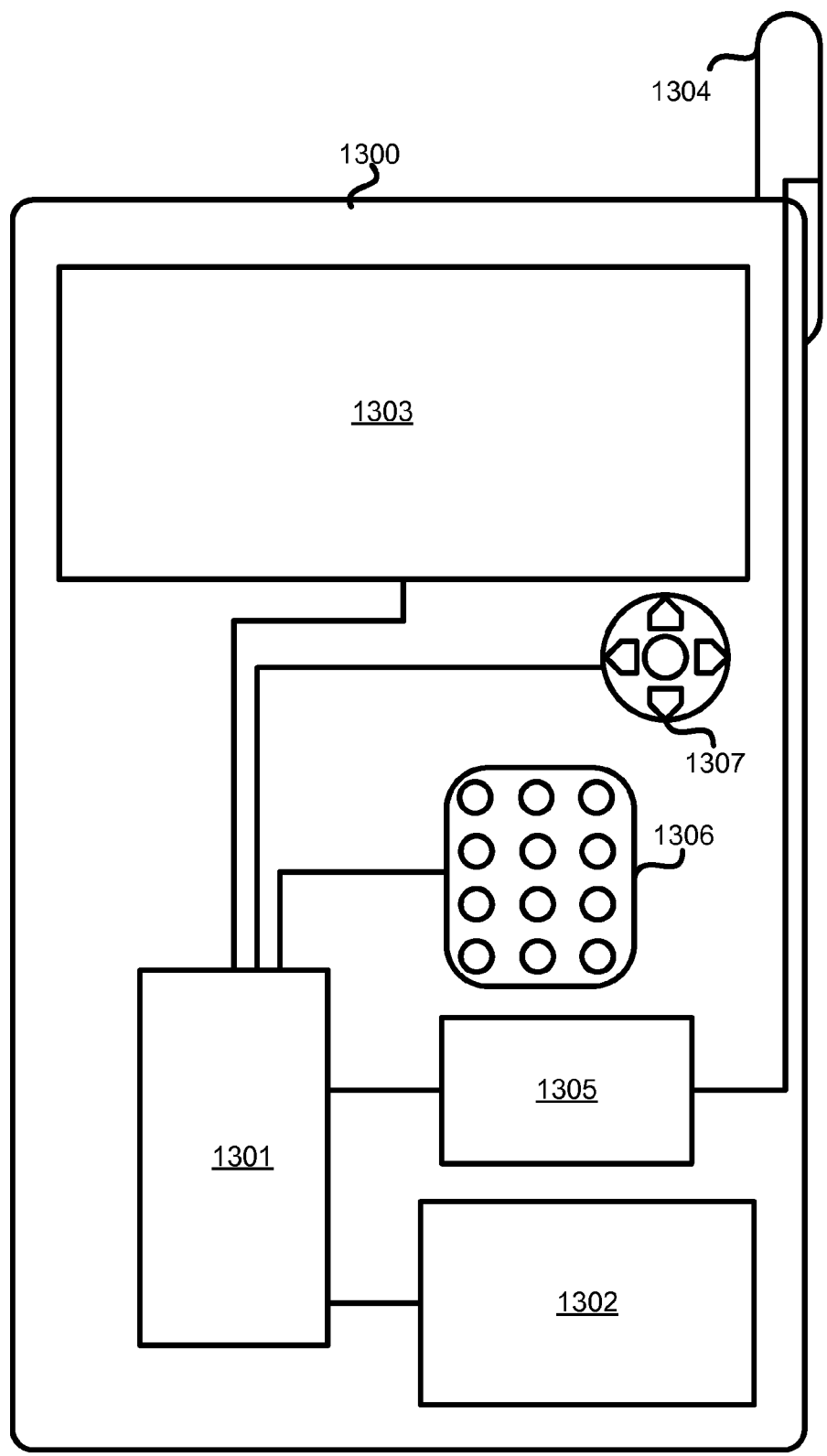
FIG. 13 is a component block diagram illustrating example components of a mobile device suitable for use in the various aspects.

As used herein, the terms "mobile handsets" and "mobile devices" are used interchangeably and refer to any one of various cellular telephones, personal data assistants (PDA's), palm-top computers, laptop computers, wireless electronic mail receivers (e.g., the Blackberry® and Treo® devices), and multimedia Internet enabled cellular telephones (e.g., the Blackberry Storm®), and similar personal electronic devices. A mobile device may include a programmable processor and memory as described more fully below with reference to FIG. 13. The term "computing device" is used herein to refer to any device including a programmable processor and memory, including mobile devices, desktop computers, workstations, mainframe computers, and embedded computer systems.

As used herein, the terms "keypad" and "keyboard" are used interchangeably to refer generally to any one of various configurations of user input devices used to convey input data to a computing device, such as a QWERTY (or other) keyboard, a number pad, a game controller, and a musical keyboard. Since the various aspects involve "virtual" user input devices whose "keys" may be displayed, projected or invisible, the terms "keypad" and "keyboard" are not intended to require physical keys that can be depressed, but rather refer to any user input device which can sense a touch (or press) by a user finger and interpret that touch as a input to the computing device.

A used herein, the term "touch sensitive surface" encompasses any surface configured to detect or sense a touch (or press) by a user finger and interpret that touch as an input to the computing device. In particular, a touch sensitive surface can determine the location of the touch of a user's finger tip. Sensing the touch and location of a fingertip on a surface can be accomplished using any of a variety of known technologies. For example, touch sensitive surfaces may include pressure sensing surfaces, capacitance-sensing surfaces, and induction-sensing services which directly detect a user's touch. As a further example, touch sensitive surfaces may detect user touches by means of optical sensors that can recognize when a fingertip is in contact with the surface. Examples of optical sensors include projection systems which can detect (e.g., by a camera or photosensor) when a user's finger interacts with a projected image, and infrared light and camera sensors which can image a user's finger tips and determine their location. A third example touch sensor may use sound or vibration measurements to detect and determine the location of a user touch, such as an ultrasound sensor that can detect a touch based upon the effect of ultrasound traveling through the cover glass, or sound or vibration sensors that can determine the location of a touch based upon triangulation of received vibration or sound from the touch on the cover glass.

A touch sensitive surface may be employed on any of a variety of surfaces, and thus is not intended to be limited to a particular type of device or form. For example, a wall, a table, a mirror, a car window or any surface, whether flat or curved, may be configured as a touch sensitive surface. As used herein, a "touch sensitive screen" or "touchscreen" is a touch sensitive surface in combination with a display. The display may be a physical display, such as a liquid crystal display (as in the Blackberry Storm®). As used herein, a "projected keyboard display" refers to a projector which can project an image of a keyboard onto a surface. A projected keyboard display may sense a touch by projecting the keyboard image onto a touch sensitive surface or by sensing a finger touch by other technologies, such as optical sensors.

As used herein, the terms "virtual keypad" and "virtual keyboard" refer to a keypad image that is displayed on or projected onto a touch sensitive surface, such as a touchscreen, or projected onto a surface in conjunction with another touch sensor technology, such as an optical sensor. In some aspects the "keys" of a virtual keypad may be displayed on a display screen or a projection, but some aspects may not provide any images. Thus a "virtual keypad" may also be an invisible keypad. A virtual keypad is not necessarily limited to numbers or letters, and as used herein encompasses any user interface involving a user activation of a key or button. Examples of non-number and non-letter virtual keypads include game controllers, device controllers (e.g., a TV remote), application interfaces, and joy sticks including a touch sensitive surface. For example, a virtual keypad may be implemented as the user interface for an MP3 or video player application.

As used herein, the term "keypad layout data" refers collectively to information regarding the location, size, shape, and orientation of keys in a virtual keypad, particularly information that can be used to generate an image of the virtual keypad.

As used herein, "envelope" refers to an acceptable range of a virtual key dimension that accounts for the inherent variability in key-strikes by a user on a touch sensitive surface. The parameter can be, for example, a relative X-axis position, a relative Y-axis position, and a display pixel matrix location range.

Figure 1:
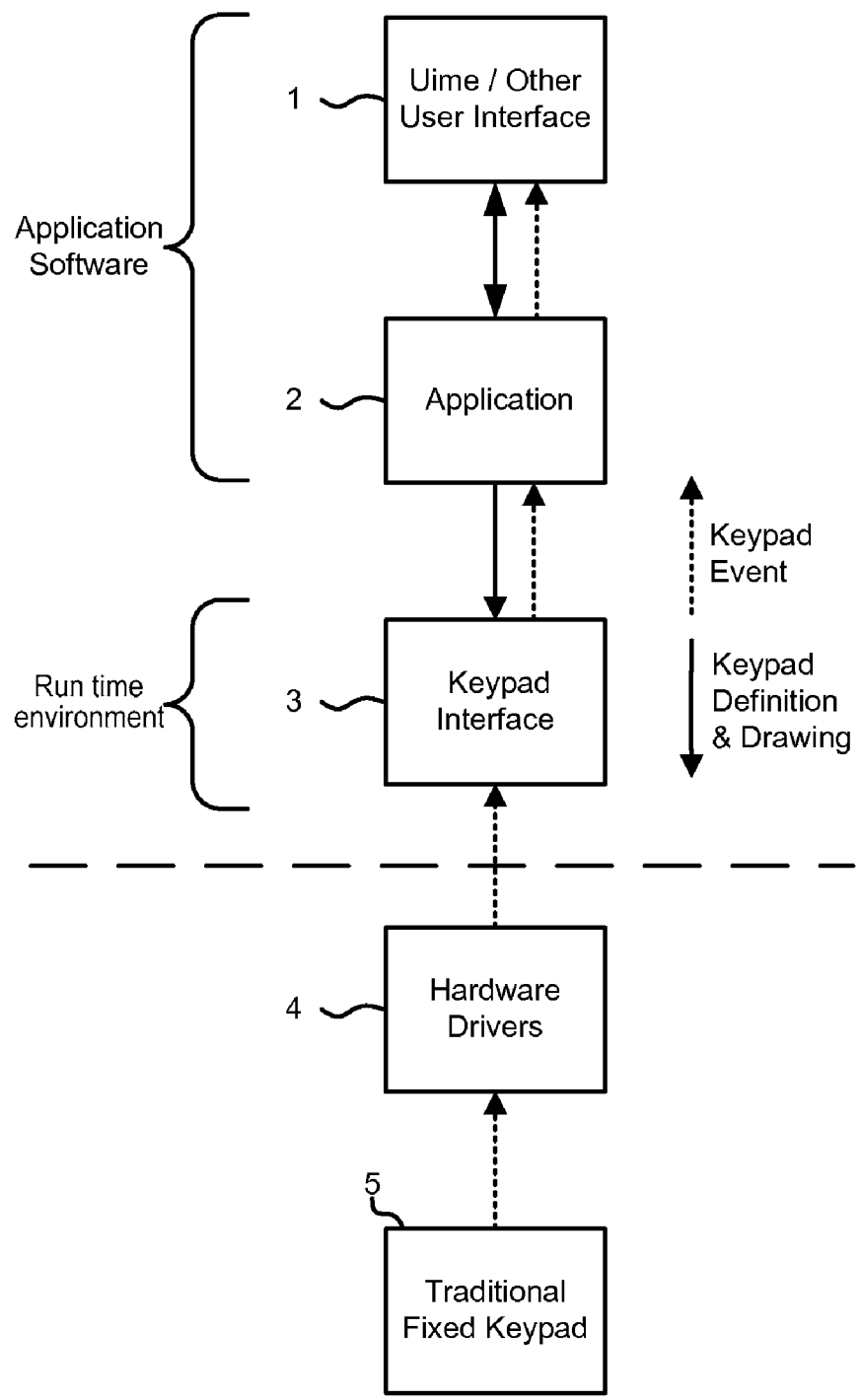
FIG. 1 is a hardware/software architecture diagram of a prior art mobile device.

An illustrative hardware/software interface of computing device keypad is illustrated in FIG. 1. The pressing of a key on the keypad 5 results in an electrical signal that can be processed by a hardware driver 4. The hardware driver 4 may be circuitry, software or a mixture of hardware and software depending upon the particular computing device (e.g., a mobile device). The hardware driver 4 converts the electrical signal received from the keypad 5 into a format that can be interpreted by a software application 2 running on the computing device. This signal may be in the form of an interrupt or stored value in a memory table which is accessible by the application 2. Such an interrupt or stored value in memory may be received by a keypad interface 3 that may be part of the runtime environment or operating system. The purpose of the keypad interface 3 is to provide a common interface between application softwares 2 and the computing device keypad 5. Thus, key press event signals may be passed on to the application layer 2 in the form of standard key press event signals or messages (e.g., ASCI character values) which the application 2 can interpret.

Using previously known system/hardware architectures such as illustrated in FIG. 1, application developers have had to adapt their software to operate with a "standard" keypad layout (for example, a QWERTY keyboard or number pad) or a keypad layout unique to each type of mobile device on which the application might be loaded. An application that requires a particular key set (for example a game or a device remote control), may not be operable on devices that have a fixed keypad layout or may be operable in a limited or user-unfriendly way. Systems and methods for providing a keypad protocol as a standard interface between application software and keypads, and other user-interfaces were recently disclosed in commonly owned U.S. patent application Ser. No. 12/139,823, entitled "Standardized Method and Systems for Providing Configurable Keypads" filed on Jun. 16, 2008. The entire contents of U.S. patent application Ser. No. 12/139,823 are hereby incorporated herein by reference for all purposes.

The various aspects of the present invention provide methods and systems for defining a keypad layout that is customized for a particular user. Using learning algorithms, a computing device implementing the various aspects can learn the key size, key spacing, and typing patterns of a user and "morph" the keys of a virtual keyboard into locations, sizes, and orientations that are comfortable for the user and that reduce user typing errors. According to an aspect, a user can create a custom keypad layout by following a teaching routine provided by a computing device. For example, a computing device may present a default keypad layout on a display and prompt the user to perform a series of key strokes. As the user follows such instructions and taps each key, the computing device can determine the touch location corresponding to each key and use that information to discover the appropriate envelopes of a keypad layout along with the location, size, shape, and orientation of the keys that match the user's hands. Results of this teaching routine may be stored as keypad layout data that the computing device uses to generate a display of the keys in a virtual keypad (e.g., on a touchscreen or projected keyboard).

The keypad layout data (and thus the layout of the virtual keyboard) may be further optimized by a training sequence in which the user types text known to the computing device (e.g., typing a paragraph presented on a display of the computing device) and the entered keystrokes are processed to record variability in key hits by the user's fingers. Analyses of a user's typing variability can be used to define an envelope for each key that can be used to further shape, locate or define the keys, and in applying auto-correction algorithms.

Learning algorithms may further be implemented to monitor the user's typing over time to correlate finger touches to virtual key locations and recognize typographical errors in order to refine the key envelopes and locations recorded in the keypad layout data. Refining the virtual keypad layout by analyzing the user's typing patterns enables the computing device to provide a virtual keyboard which helps reduce user typing errors. User key stroke errors may be recognized by noting user corrections of typed letters or numbers, and by recognizing incorrect keystrokes via spell checking or predictive text techniques. The output of such learning algorithms may be refined keypad layout data that may be stored in memory and associated with the user.

The keypad layout data may be in the form of one or more data tables which can be stored within memory of a computing device, on a tangible media, and transmitted via a communication link. Transmitting keypad layout data to another computing device may enable a user's customized keyboard to be implemented on other computing devices. By enabling users to create portable virtual keyboards that are customized to the user's hand size, reach, dexterity, and typing patterns, the various aspects facilitate the efficient entry of data in a manner that can adapt to both changes in the user's physiology and changes in the technology used for data entry.

As described more fully below with reference to FIG. 2, learning algorithms associated with the various aspects may be implemented within a computing device in a learning module, which may be a module of processor-executable instructions operating on a processor of the computing device. By way of illustration and not by way of limitation, a learning module may use a training routine and track user typing over time to define a keypad layout of a QWERTY keyboard customized for a particular user.

The various aspects may be implemented on computing devices that use any of a variety of virtual keyboards, such as a touch sensitive surface, touchscreen, and a projected keyboard display.

While the learning module and training routines are described below in the context of a QWERTY keyboard layout, the various aspects may be applied to define other types of keypads, such as numeric keypads and alphanumeric keypads with different key layouts. For example, the various aspects may also be applied to the variant forms of QWERTY keyboard layouts, including those defined for Canadian Multilingual Standard, Canadian French, Czech, Danish, Dutch, Faroese, Irish, Italian, Norwegian, Polish, Portuguese (Portugal), Portuguese (Brazil), Romanian (in Romania and Moldova), Slovak, Spanish (Spain), Spanish (Latin America), Swedish/Finnish, United Kingdom, United Kingdom extended, and US-International. The various aspects apply equally well to other types of keyboard layouts including, for example, QWERTZ (including those defined for Czech, Hungary, Germany, and Austria, Slovak, Bosnian, Croatian, Serbian (Latin), and Slovene, Serbian (Cyrillic), Swiss German, Swiss French, Swiss Italian, Liechtenstein, and Luxembourg), AZERTY (including those defined for French and Belgian), QZERTY, the Dvorak keyboard, the Colemak keyboard, Turkish, and chorded keyboards. Further, various aspects may be applied to keyboards optimized for non-Latin alphabets and non-alphabetic writing, including, for example, Arabic, Armenian, Greek, Hebrew, Russian, Ukrainian, Bulgarian, Devanagari, Thai, Khmer, Tibetan Script, Tibetan (China), Dzongkha (Bhutan), Chinese, Japanese, Hangul (for Korean), Dubeolshik, Sebeolsik 390, Sebeolsik Final, and Sebeolsik Noshift. Further, various aspects could be applied to musical keyboards, such a piano keyboard.

Before a user has trained the computing device to generate a customized virtual keyboard, the computing device may display a keyboard based on a default layout, such as a standard sized QWERTY keyboard consistent with the dimensions of the touch sensitive surface (e.g., a touchscreen). As the user interfaces with this default keyboard as described below, the learning module may reposition keys so that at the end of such training the user's virtual keyboard layout differs from the default layout.

Alternatively, the computing device may be configured to enabled users to position and orient virtual keyboards to their liking. In order to learn about the physiology of a user's hands, the computing device may issue instructions to the user, such as via a speaker or displayed text, to position his or her hands on a touch sensitive surface where the user prefers the keyboard to be positioned. For example, the users may be instructed to place their hands on the touch sensitive surface so that the fingers of the left hands touch where the user prefers the "ASDF" keys to be located, the fingers of the right hand touch where the user prefers the "JKL;" keys to be located, and the thumbs touch where the user prefers the space key(s) to be located. The computing device determines the touch locations of each finger and uses this touch information to generate and display a virtual keyboard sized and oriented to match the user's finger touches.

As part of enabling a user to define the location and size of a virtual keypad, the computing device may remind the user that studies have shown that the closer the fingers are positioned on a keyboard the faster one can type. Additionally, the user may be prompted that it is okay to rest the palms on the surface if that is more comfortable.

The position of the fingers may be captured by the touch sensitive surface and recorded by the computing device according to a coordinate system. For example, the position of the "A" key and the ";" key may be determined relative to a display matrix or to an "X-Y" coordinate system, with the coordinates saved in the keypad layout data. The finger tip position data may be processed by the learning module implemented in the computing device. Keys may be defined in terms of a center point of a user's finger touch and an envelope defining a size and shape of the key. As described more fully below, the envelope may be sized based upon statistical analyses of the location of particular key touches while the user types, so that the envelope may encompass a majority of user touches. The envelope may be used to generate an image with the image centered on the center point coordinate. Envelope information may also extend beyond the key image such as to provide information that a computing device (or keypad driver) may use to disambiguate a keystroke that falls between key images.

In a teaching process a computing device may learn appropriate locations of the other keys of the particular virtual keyboard. Appropriate key locations may be defined according to a coordinate structure of the touch sensitive surface, such as X and Y coordinates, or according to relative offsets in which each key is positioned a set distance and angle away from each adjacent key. In a coordinate system, keys may be located at a center point corresponding to the centroid of user touches and sized based upon an envelope that may be defined by the variability of user touch positions. In a relative location system, all keys may be positioned based upon defined positions of two or more anchor keys. The coordinates and sizes of keys of a coordinate system virtual keyboard and the relative offsets of keys one-to-another of a relative system may be stored as the keypad layout data.

In another aspect, the training routine may continue to improve the key-strike accuracy of the user. The user may be asked a type specified phrase or paragraph over a number of cycles. For example, the user may be provided a paragraph to type or a prompt showing a current word and two words ahead that the user should type. In a first cycle, as the computing device prompts the user to hit each letter, the key may move to where the user's finger touches. The learning module may be configured to ignore typing errors defined as key-strikes a threshold distance from the location of the center of the correct key. In a second cycle, the center point (i.e., the location of the center of the key) may be determined as an average of the locations of the key-strikes of the user. In subsequent cycles, the occurrences of previous center points may be scaled less each time as the user gets more comfortable with the keypad layout. When the user's key-strike speed and error rate plateau, the training routine may terminate.

Figure 2:
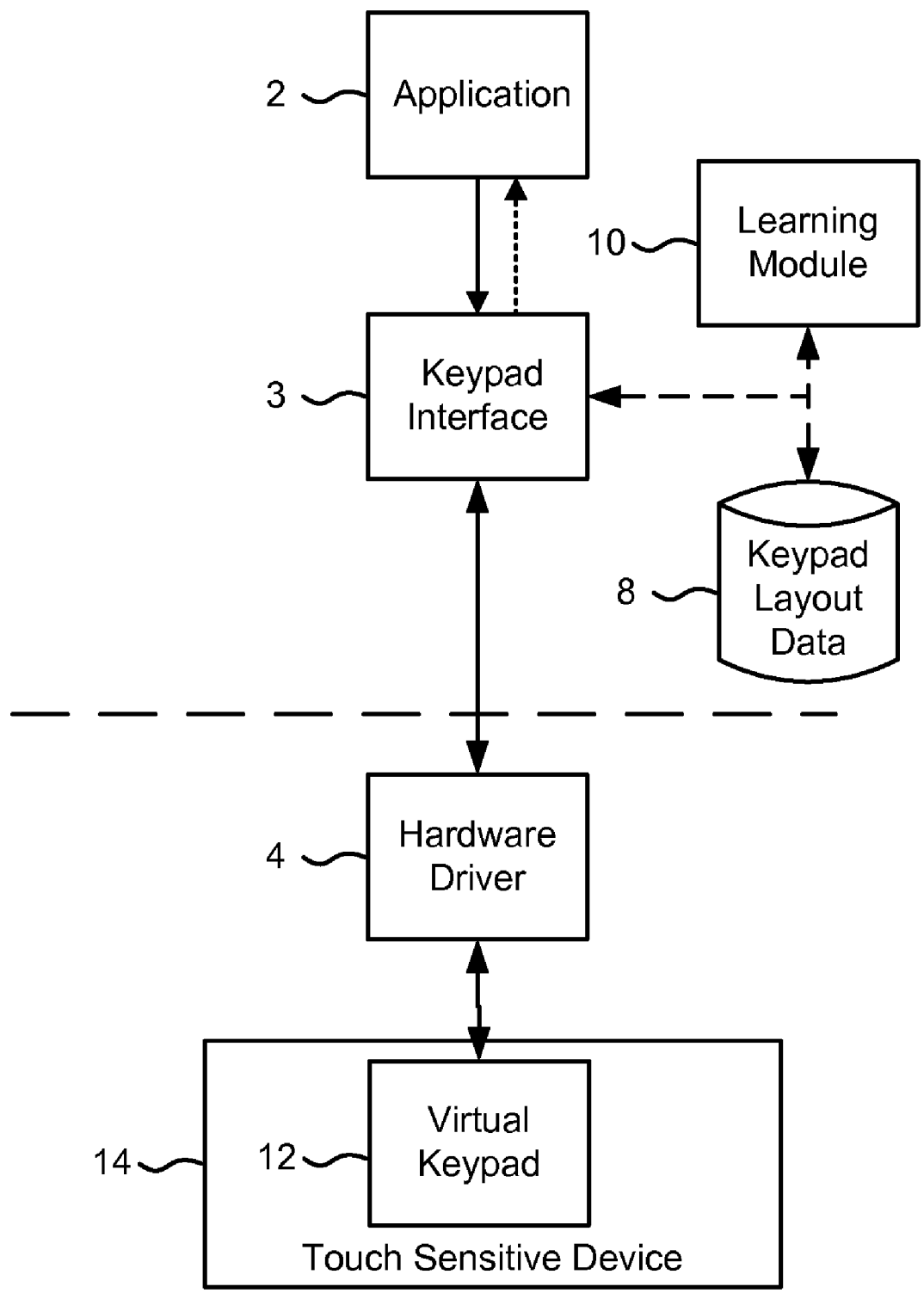
FIG. 2 is a system component diagram of a mobile device enabled by the various aspects.

FIG. 2 is a system component diagram of a computing device enabling the various aspects. The computing device may include a touch sensitive surface 14 on which is displayed a virtual keyboard 12. The touch sensitive surface 14 may be coupled to a hardware driver 4 which receives signals associated with touches to the surface and translates those signals into touch event and coordinate signals that can be interpreted by the computing device operating system, such as a keypad interface 3. For ease of description the keypad interface 3 is illustrated as a process module, but it may be a part of the functionality of the computing device operating system or a firmware or hardware component of the computing device. In an example implementation, the keypad interface 3 functionality relays touch event signals to applications 2 operating within the context of the operating system in a format that can be interpreted by the application. Depending upon the hardware and computing device implementation, the hardware driver 4 for the touch sensitive surface 14 in combination with the keypad interface 3 may generate the virtual keyboard 12 display. Further, the hardware driver 4 and/or the keypad interface 3 may interpret touches on the touch sensitive surface 14 as touches on particular keys based on the location coordinates of the touches. The keypad interface 3 then may communicate a key press event to the application 2 that identifies the pressed key as if from a physical keyboard.

In an aspect, the keypad interface 3 may cooperate with a learning module 10 configured to learn appropriate key locations from a user's keystrokes. As described above, the learning module 10 may receive information regarding locations of finger touches on the touch sensitive surface 14 from the keypad interface 3 or the hardware driver 4 and correlate this coordinate information with expected keystrokes to generate or refine keypad layout data 8 that is stored in memory. The keypad layout data 8 generated by the learning module 10 may then be accessed and used by the hardware driver 4 (or the keypad interface 3 in some implementations) to generate the virtual keypad 12 displayed on the touch sensitive device 14. The keypad interface 3 or the hardware driver 4 may also use the keypad layout data 8 to translate touch coordinates received from the touch sensitive surface 14 into key touch events that can be communicated to an application 2. Configured in this manner, the learning module 10 may continuously refine the keypad layout data 8 without interfering with or slowing communication of key touch events to applications 2 running on the computing device.

In an aspect, the learning module 10 may be processor-executable processes which interpret user keystrokes on a virtual keypad 12 and refine keypad layout data 8 specifying the placement, orientation, and size of virtual keys in order to reduce typing errors and increase the typing proficiency of a user. The learning module 10 processes may be implemented as an application 2, as a part of the computing device operating system, or as part of a hardware driver 4. The learning module 10 may also receive information from other applications, such as a training application, spell checking applications (such as may be implemented within a word processing application), and auto-correction applications that can inform the learning module 10 of intended or predicted keystrokes. Using learning algorithms, artificial intelligence, or other inference processes, the learning module 10 may correlate each keystroke to a desired or proper key in order to link the geometry of the touch sensitive surface 14 to particular keys. Such linking of the geometry of the touch sensitive surface 14 to keys of the virtual keypad 12 may involve statistical analyses to account for the inevitable variability in a user's keystroke placement. The keypad layout data 8 output of the learning module 10 may be in the form of a correlation matrix stored in memory that a keypad driver 4, keypad interface 3 or other element of the computing device operating system can use to translate a touch event on a virtual keypad into an appropriate character (e.g., an ASCII character value). As the learning module 10 processes user keystrokes and updates the keypad layout data 8 correlation matrix, the size, position, shape, and orientation of each key of the virtual keyboard may change consistent with the patterns recognized by the learning module 10.

Figure 3:
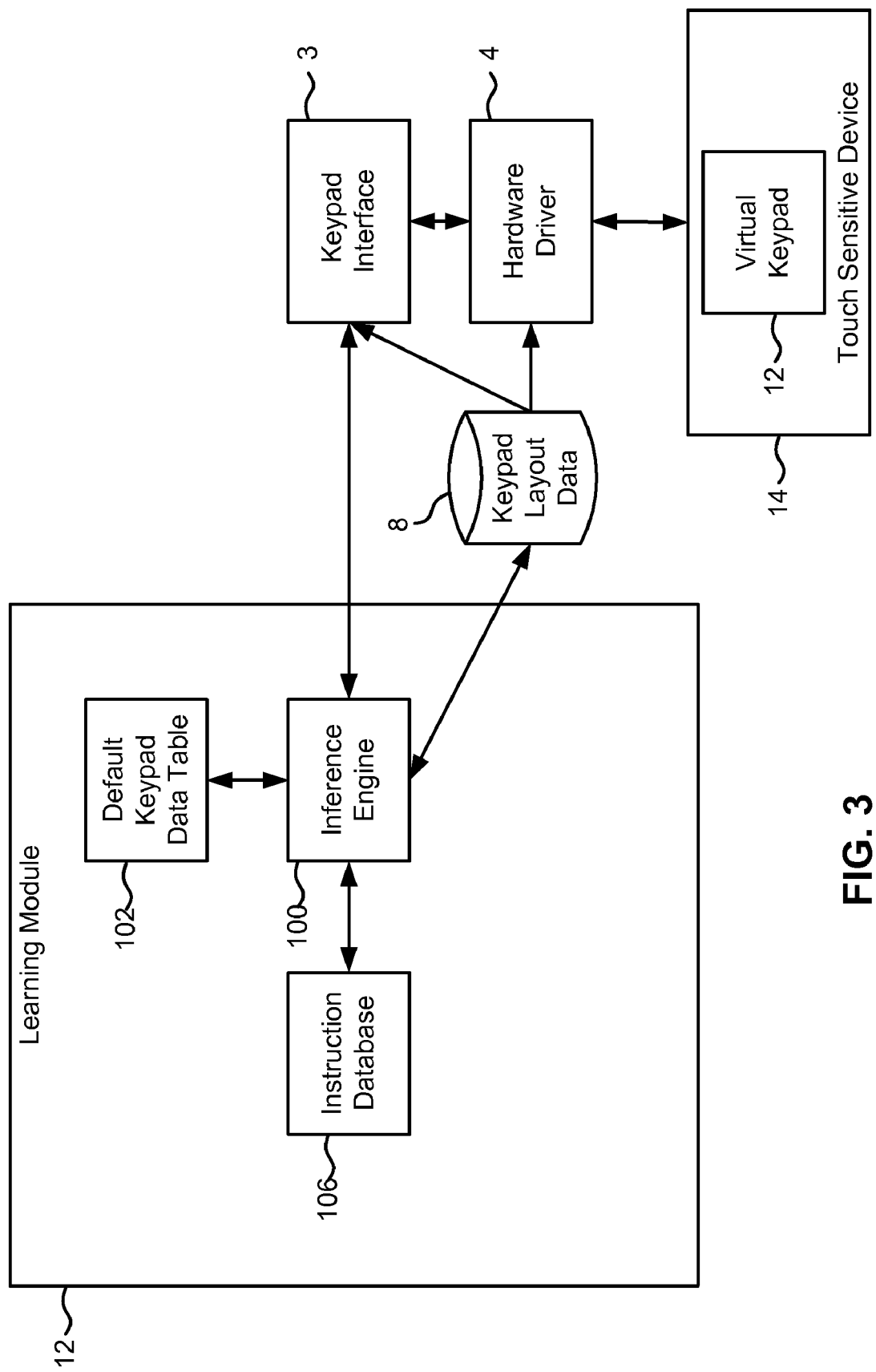
FIG. 3 is a system component diagram of a learning module enabled by the various aspects.

FIG. 3 is a system component diagram of illustrative functionality that may be included in a learning module 10. The learning module 10 may include an inference engine 100, a default keypad data table 102, and an instruction database 106. The inference engine 100 may be in the form of processes and rules that are executed on the computing device processor. The default keypad data table 102, which may be stored in memory of the computing device, may be preprogrammed keypad layout data that may be used to display a default virtual keyboard and interpret keystrokes before learning routines have been completed to generate the keypad layout data 8. The learning module 10 may also include an instruction database 106 that may be stored in a memory which includes training commands and training text samples that may be presented to a user during initial training routines.

Figure 4:
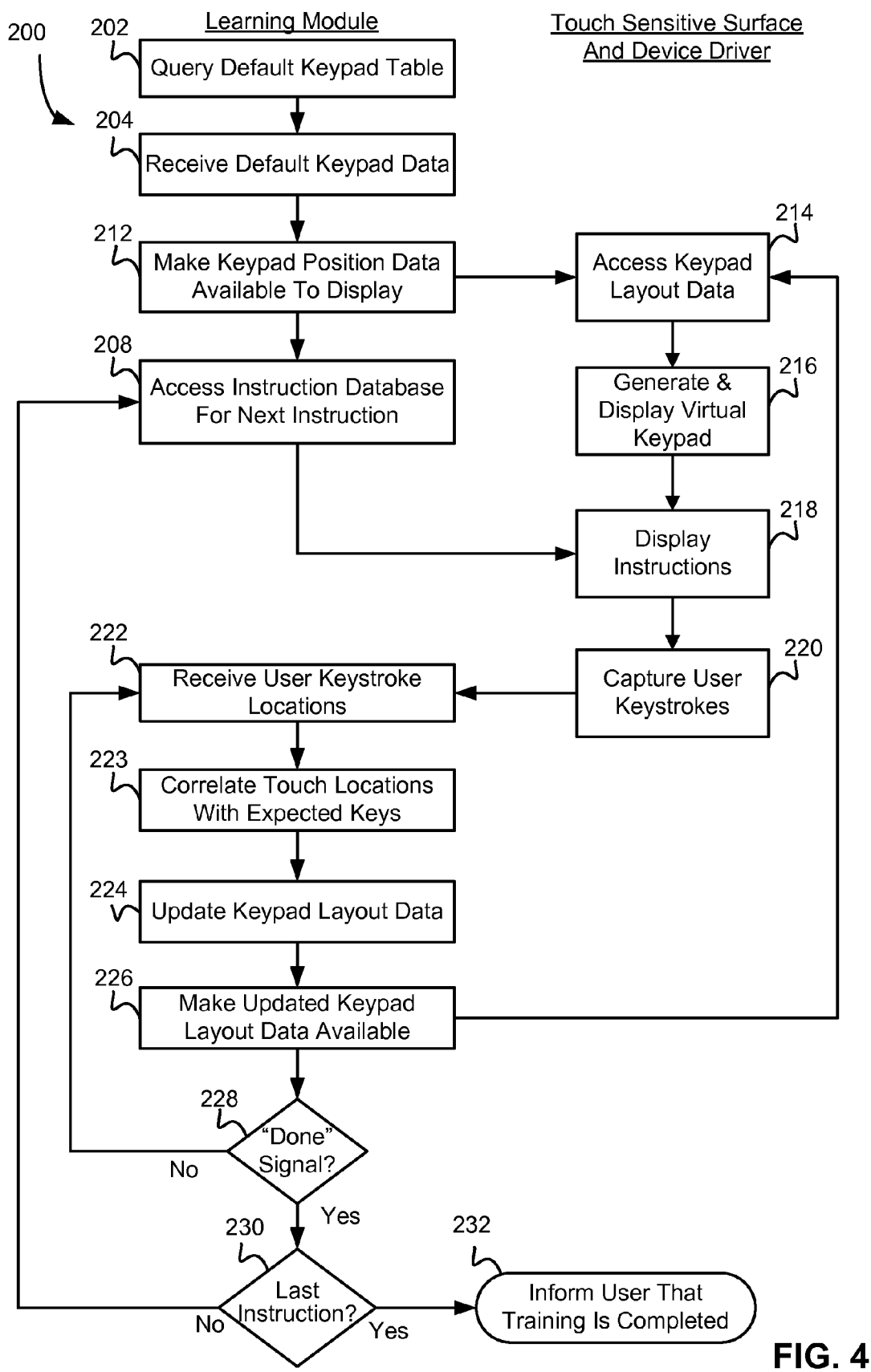
FIG. 4 is a process flow diagram illustrating a teaching routine for generating a virtual keypad on a touch sensitive screen.

FIG. 4 is a process flow diagram illustrating an example teaching process 200 for generating a virtual keypad on a touch sensitive surface according to an aspect. Referring to FIG. 4, in process 200 at block 202, the learning module may query a default keypad layout table for key location data to generate a default keypad data, with the data received in block 204. In an aspect, the default keypad data may include key location data in an "X-Y" coordinate system correlated to the touch sensitive surface. In another aspect, the default keypad data may include key location data in a row-column matrix format that defines pixel locations of a touch screen connected to the computing device. In another aspect, the default keypad data may include average distances between center points of each key of the default keypad layout.

In process 200 at block 212, the learning module 10 within the computing device may make the default keypad layout data available to the touch sensitive surface hardware driver 4, keypad interface 3 and, optionally, to a display driver for generating an image of the virtual keyboard. For example, the learning module may load the default keypad layout information into the keypad layout data 8 so the touch sensitive surface device driver 4 (or other component of the computing device or operating system) may access the layout data at block 214 and use the data to generate a display of the virtual keypad at block 216.

In process 200 at block 208, the learning module may also access an instruction database to obtain a next instruction to provide to the user as part of the training routine. As described more fully below with reference to FIG. 5, a series of training instructions may be stored in a database that the learning module can access sequentially and present to a user. At block 218, the selected construction may be displayed or presented aurally to the user. At block 220, as the user follows the instructions, such as by typing a displayed paragraph or sentence, while the touch sensitive surface device driver captures the coordinates of the user's touches. At block 222, the learning module 10 receives the keystroke locations from the touch sensitive surface. At block 223, the learning module may correlate the touch coordinates with the particular key that was expected based upon the instructions to the user. For example, if the user has been presented with a sentence to type, the expected key is the next letter in the sentence to be typed. In correlating the touch locations with expected keys, the learning module associates particular touch sensitive surface coordinates with particular keys. In an aspect, the learning module may also compare the received touch locations to the default keypad layout data to infer the key that was typed.

In a further aspect, both the expected key and the default keypad layout data may be used to determine the key that should be associated with a particular keystroke coordinates. At block 224, the touch coordinates-to-key association may be used to update or generate keypad layout data that is stored in memory. At block 226, the learning module may make the updated keypad layout data available to the touch sensitive surface device driver (or other components of the computing device) so that the updated keypad can be displayed to the user, as described above with respect to block 214.

At determination block 228 in process 200, the learning module may determine whether the user has signaled that a particular step is done. Some, though not all, training instructions may ask the user to signal when a particular step has been accomplished, such as by tapping the spacebar twice. If the instruction is not done (i.e., determination block 228="No"), the learning module may return to block 222 to receive the next user keystroke coordinates and update the keypad layout data for the next key. If the particular instruction is done (i.e., determination block 228="Yes"), the learning module may determine whether the last training instruction has been reached at determination block 230. If the last instruction has not been reached (i.e., determination block 230="No"), the learning module may return to block 208 to access the next instruction from the instruction database. Training of the user may then proceed by repeating the process as described above with respect to blocks 218 through 230. If the last training instruction has been reached (i.e., determination block 230="Yes"), the third learning module may inform the user that training is completed and the training process may be terminated at block 232.

While FIG. 4 illustrates that the instructions may be displayed on the touch sensitive screen, the instructions may be provided to the user via other means. For example, the instructions may be presented aurally through the audio components of the computing device.

In an alternative aspect, the computing device may be configured to enable a user to select and move keys to preferred locations. In such an implementation the virtual keyboard may be displayed on the touch sensitive surface and the user prompted to touch and hold a key and then slide it to a new location before lifting the finger off of the touch sensitive surface. The learning module may recognize the touch and slide motion, and update the keyboard layout data to record the new location for the particular key. In a similar manner, users may be allowed to resize an entire keyboard by touching several keys on the displayed virtual keyboard, and then moving all finger to stretch, resize, and reorient the virtual keyboard. For example, users may be prompted to touch the A, S, D, F, J, K, L, and; keys on a virtual QWERTY keyboard, and then slide the fingers apart to expand the virtual keyboard, or slide the fingers together to shrink the virtual keyboard. The user may be prompted to hit a particular key sequence (for example, the space key twice) to signal completion of this key repositioning process.

As mentioned above, training instructions used by the learning module 10 may be stored in an instruction database 106, which may be in the form of a data table such as illustrated in FIG. 5. Such an instruction database data table 300 may include various instructions 306 that may be referenced by the learning module 10 via an index 302, and used to generate a display or sound aural instructions to a user. The instruction database data table 300 may also include the keystrokes 308 that the user is expected to press so that the inference engine 100 can correlate key touch locations to particular keys. For example, the instruction database data table 300 may include initial instructions for positioning the keyboard on the touch sensitive surface (index 0) and resizing the default keyboard (index 1), followed by training texts that a user may type to enable the inference engine 100 to learn the user's typing patterns (indices 2 and 3). By organizing training routines in an instruction database 106, updates to the inference machine 100 and the training routines can be accomplished without replacing the entire learning module 10.

Figure 8:
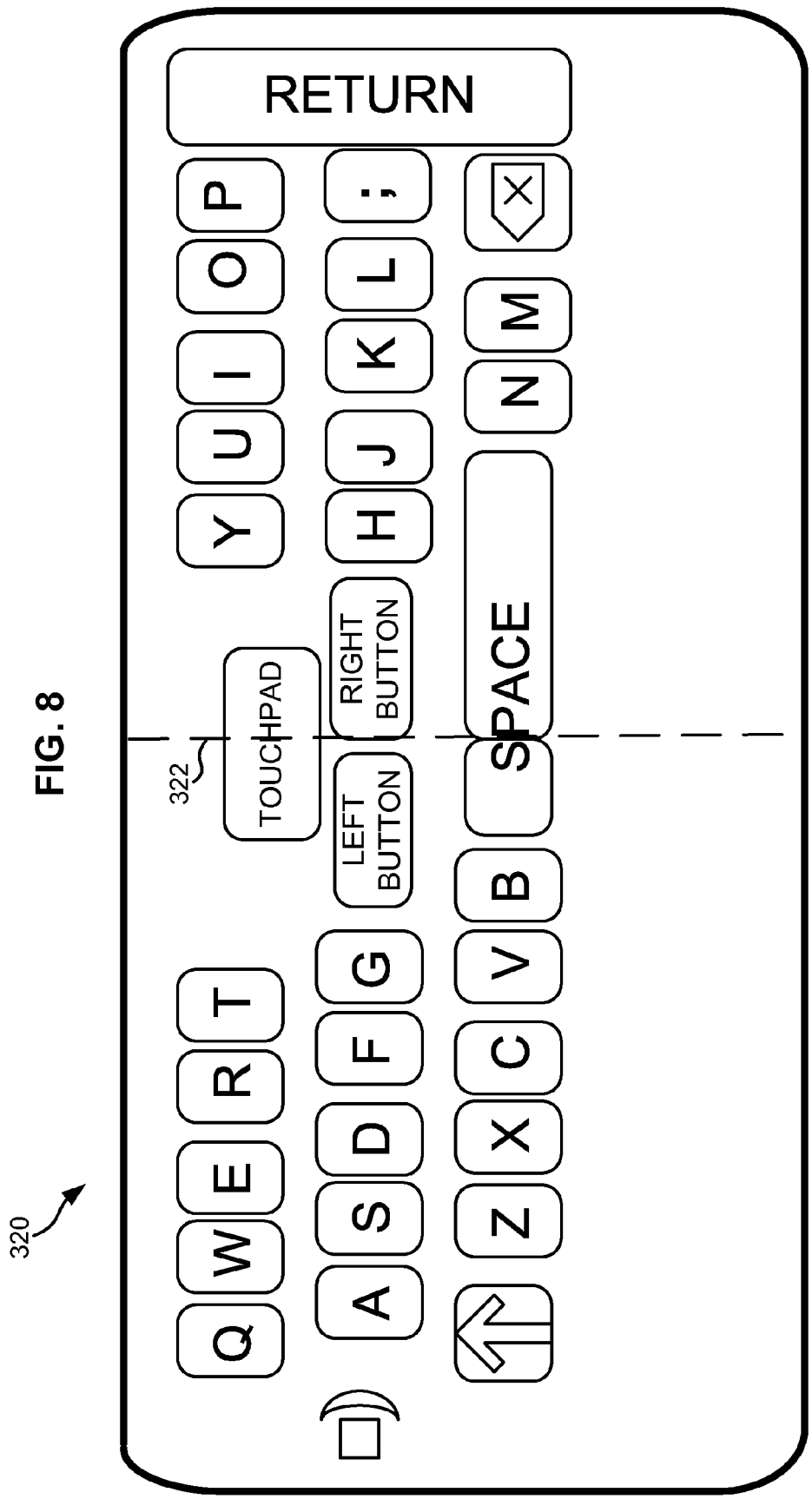
FIG. 8 is an illustration of a default virtual keyboard layout suitable for use in an aspect.

Operation of the learning module 10 may be illustrated by way of an example in which the learning module 10 learns about a user's finger locations, allows the user to reposition various keys, and administers a series of typing sessions to further optimize the virtual keyboard layout. For example, the user may be instructed (via a speaker or displayed text) to position his or her left hand on the touch sensitive screen in an area where the user prefers the "ASDF" keys to be located, his or her right hand on the touch sensitive screen in an area where the user prefers the "JKL;" keys to be located, and each thumb where the user prefers the space keys to be located. Alternatively, the user may be presented with a default layout of the keyboard and asked to place his or her fingers on particular keys. For example, FIG. 8 is an illustration of a default keypad layout 320 that may be presented to a user on a touch screen of a mobile device with touch screen surfaces on both sides so that when opened the user is presented with a near-full sized virtual QWERTY keyboard.

Once an initial virtual keyboard layout is established, the learning module 10 may prompt the user to participate in training routines in order to refine the keyboard layout so as to improve the key recognition consistent with the user's particular typing patterns. For example, the user may be prompted to type a variety of fixed phrases one or more times. For example, the user may be provided a prompt on the display to type a phrase, such as "The quick brown fox jumped over the lazy dog's back." As the user hits each letter, the learning module 10 compares the touch location information received from the touch sensitive surface with the expected key. The touch location information may then be correlated to the expected key in the keypad layout data 8. In an aspect, the displayed virtual keyboard image may be adjusted with each keystroke so that key images may move to where the user typed them. The learning module 10 may be configured to ignore typing errors such as key-strikes a threshold distance from the expected location of the expected key.

Figure 9:
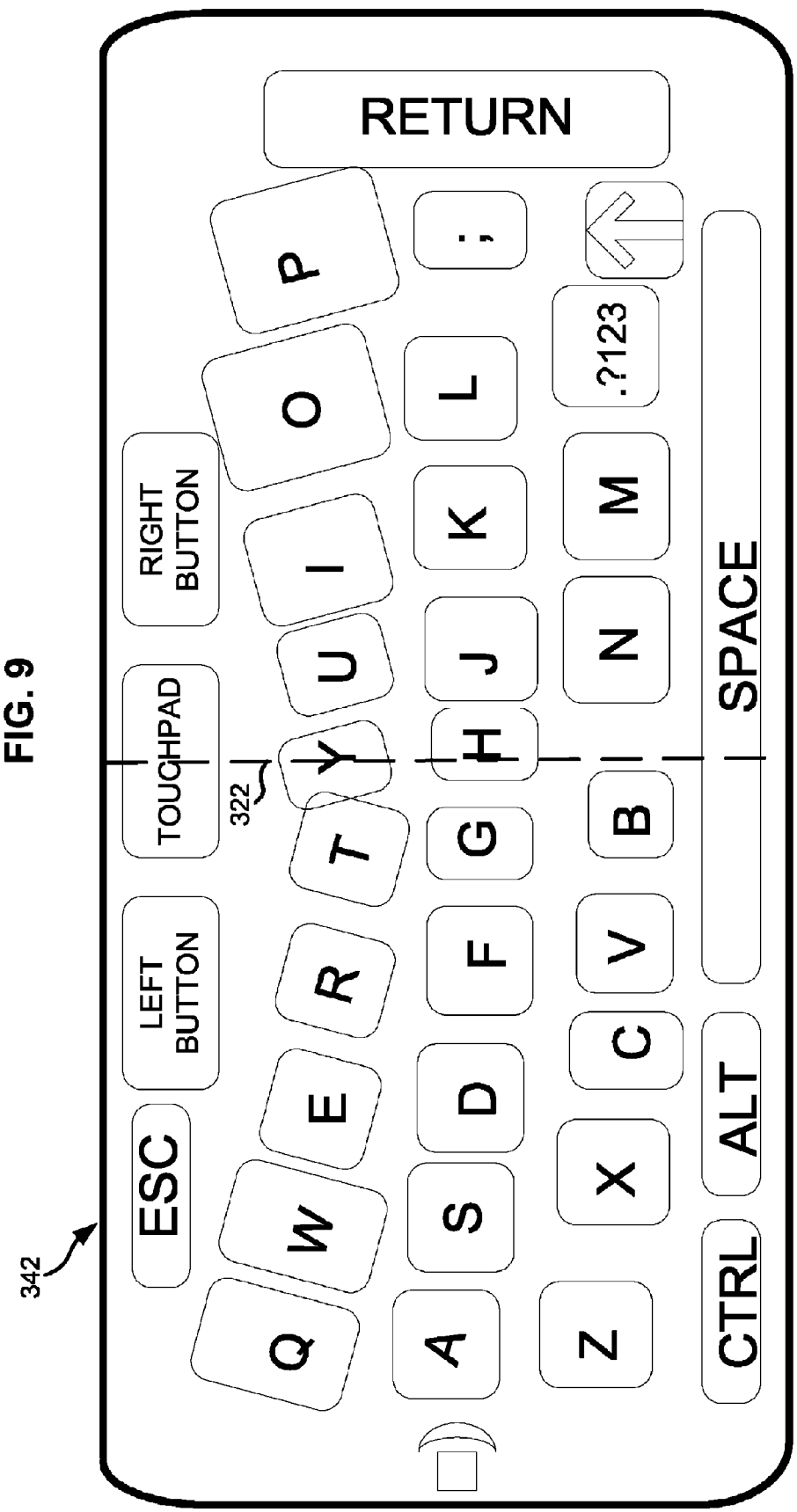
FIG. 9 is an illustration of an example virtual keyboard layout after customization according to various aspects.

The more the user types, the better the learning module can customize the virtual keypad to the user's unique typing patterns. As the user proceeds to type the displayed phrases, the center point locations of each key may be averaged to reflect a typical key-strike location for each key by the user. As such training routines proceed and the number of key-strike locations build up, the average touch center point may change less and less, while information regarding the variability of the user's key-strikes on particular keys may be obtained. In order to accommodate normal key-strike location variability, the learning module may calculate statistical parameters reflecting the key-strike location variability, such as the standard deviation about the average center point, and size the virtual key image to reflect this variability. Thus, keys which the user strikes in a consistent location (e.g., the "F" and "J" keys on a QWERTY keyboard) may be displayed with a relatively small size and symmetrical shape (e.g., an oval or square), while keys that are struck inconsistently may be displayed with a relatively large size and asymmetrical shape (e.g., longer along an axis of variability). The results of such learning about the user's typing patterns are then stored in the keypad layout data which are used to generate the display of the customized virtual keypad. An example of a customized virtual keyboard layout after key locations and shape have been optimized in this manner is illustrated in FIG. 9.

Figure 6A:
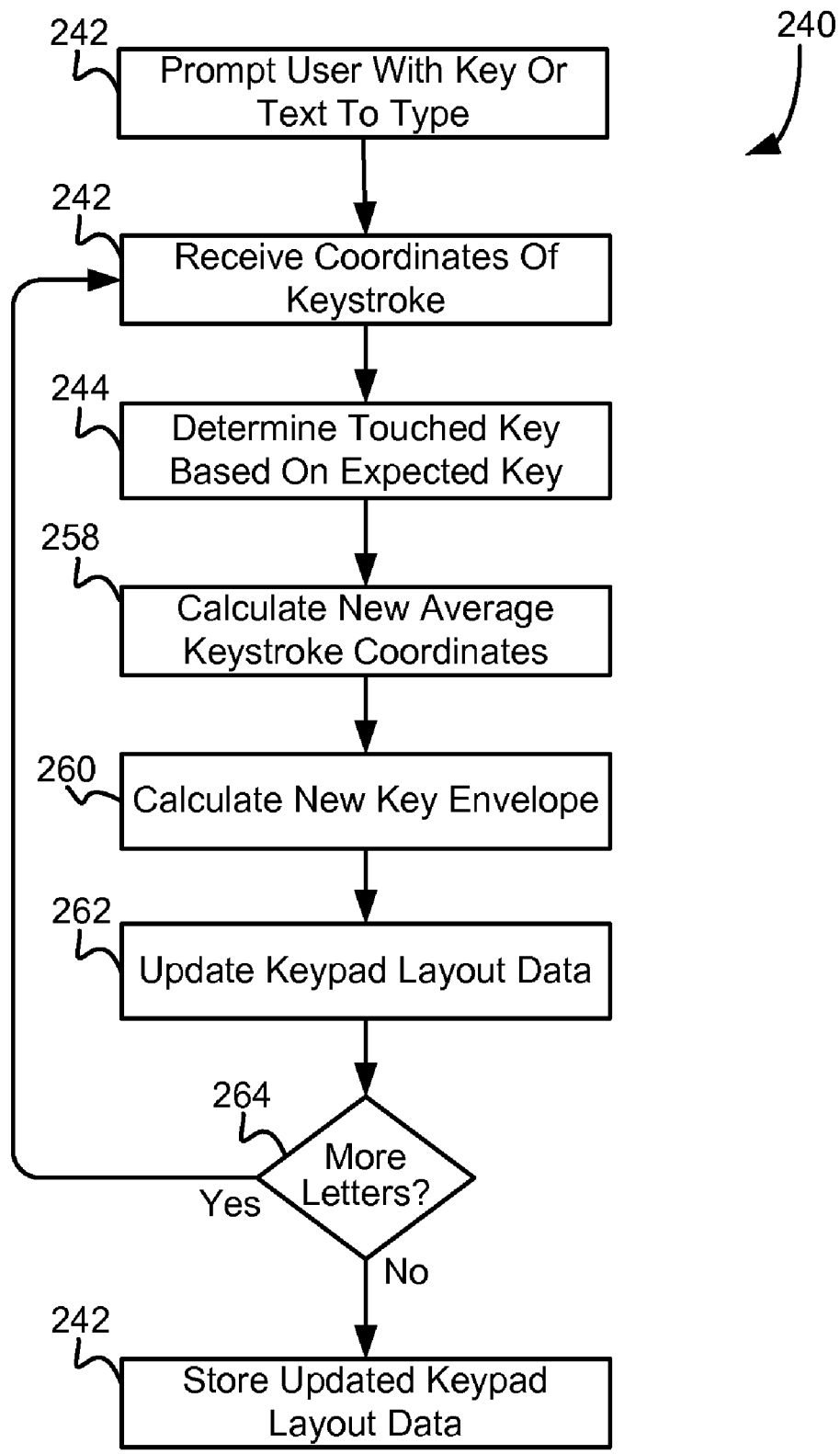
FIG. 6A is a process flow diagram illustrating an example learning routine for optimizing a virtual keypad layout by analyzing a user's typing of known text.

FIG. 6A illustrates an example process 240 that may be implemented within a learning module 10 to learn a user's keystrokes in a training routine. In process 240 at block 242, the learning module 10 within the computing device may prompt a user to enter a series of keystrokes or type some defined text. This may be accomplished by displaying text that the user should type on the computing device display or by playing an audio file through the computing device audio circuits. As the user types on the virtual keyboard (e.g., illustrated in FIGS. 8 and 9) the computing device receives coordinates of each keystroke from the touch sensitive surface in block 242. At block 244, the learning module 10 may determine the particular key touched with each keystroke based upon the key expected to be typed. For example, the learning module 10 may follow along as the user types the prompted keystrokes or text. At block 258, the learning module 10 may calculate a new average keystroke coordinate associated with the key determined at block 244. For example, the learning module 10 may add the received touch coordinates to previously received touch coordinates for the particular key and calculate new average coordinates. Also, in block 260, the learning module may calculate a new key envelope, such as by updating a statistical parameter corresponding to the variability of the user's keystrokes. Using the calculated average keystroke coordinate and new key envelope statistics, at block 262 the learning module 10 may update the keypad layout data 8. In determination block 264, the learning module may determine whether there are more letters to be typed by the user based upon the text that has been entered. If more text is to be entered (i.e., determination block 264="Yes"), the learning module may continue to receive the coordinates of the next keystroke, returning to block 242. However, if the user has typed in all of the presented text, so that the particular learning session has come to an end (i.e., determination block 264="No"), the learning module may store the updated keypad layout data 8 in memory in block 242. This updated keypad layout data may then be available to the virtual keyboard generator (i.e., touchscreen, projection keyboard device, etc.).

FIG. 6A also illustrates a simple training mode that enables a user to specify the placement of each key in the virtual keypad by touching the touch sensitive surface where each key should be positioned. In this manner, there is no need for a default keyboard layout and the user can create a keyboard of any orientation within the boundaries of the touch sensitive surface. In process 240 at block 242, the learning module 10 may prompt the user (e.g., visually or aurally) to sequentially type each key from A to Z in sequence. The user then may sequentially touch the surface to indicate the desired position for each letter key. At block 242, the learning module 10 receives the coordinates of each touch. Since the user is expected to touch the surface once for each key location, at block 244 the learning module 10 determines the touched key based upon the next key in the sequence. At block 258, the learning module calculates the keystroke coordinates for the touched key (i.e., the average of a single set of keystroke coordinates is the coordinates themselves). Block 260 may be unnecessary the first time that a user defines the keyboard layout since the user has only touched the surface one time for each key. At block 252, the learning module updates or creates for the first time the keypad layout data linking the determined key to the touched location. This process continues until a touch for each key have been received (i.e., determination block 264="No"), at which point the keypad layout data is stored in memory at block 242.

By providing users with a number of different text samples to practice on, the learning module 10 can enable users to customize their virtual keyboards to reduce their typing errors. Thus, the process of training the learning module 10 may be similar to the manner in which users trained voice recognition systems.

Figure 6B:
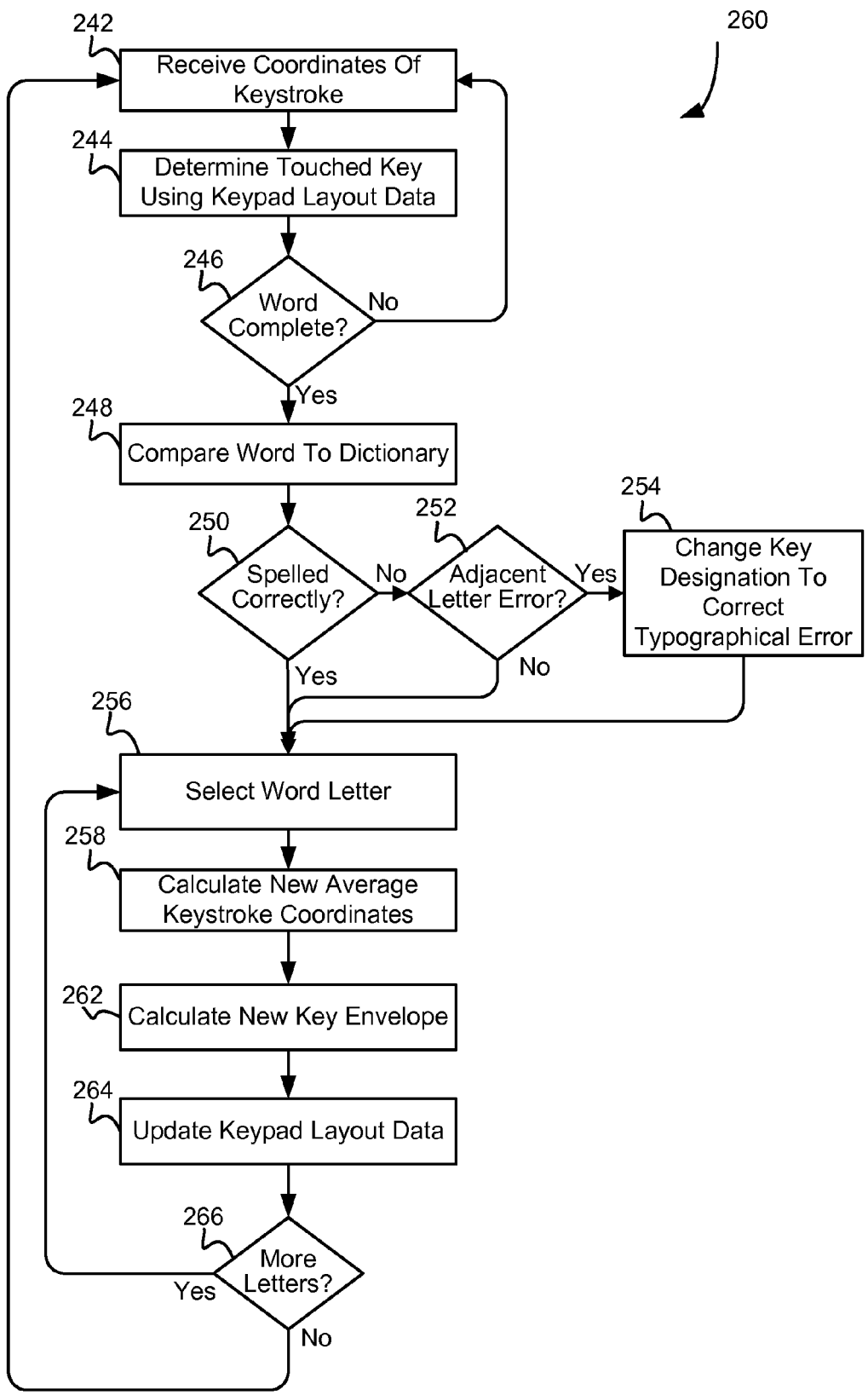
FIG. 6B is a process flow diagram illustrating an example learning routine for optimizing a virtual keypad layout by analyzing a user's typing of unknown text.

In an aspect, the learning module 10 may continue to track the typing of a user in order to refine the keyboard layout data 8, and thereby provide a more optimized keyboard layout. FIG. 6B illustrates an example process 260 that may be implemented in a learning module to continuously refine a virtual keyboard by recognizing common typographical errors. In process 260 at block 242, the learning module may monitor user typing on the virtual keypad and receive coordinates of each keystroke. At block 244, the learning module may determine the touched key using the keypad layout data 8 stored in memory. In this manner, identification of the key that was touched may be accomplished by the learning module 10 using the same data that is used by the device driver 4 and/or keypad interface 3 as illustrated in FIG. 3. Alternatively, the learning module 10 may receive the key identity from the device driver 4 or keypad interface 3. Using spell checking routines or predictive text entry routines, the learning module 10 may determine whether the typed word is complete in determination block 246. A complete word may also be recognized by entry of a space, comma, or period. If the word is not complete, the learning module 10 may continue to monitor keystrokes and determine the corresponding key-strikes (repeating blocks 242 and 244). When the learning module determines that the word is complete (i.e., determination block 246="Yes"), the learning module may compare the entered word to a spell checking dictionary in block 248. In this manner, the learning module 10 can determine whether the letters of the typed word have been recognized correctly. In decision block 250, the learning module 10 may determine whether the entered word is spelled correctly. If the entered word is determined to be spelled correctly (i.e., determination block 250="Yes"), the learning module 10 may proceed to use the received keystroke data to update the keypad layout data by executing blocks 256 through 266. Specifically, at block 256, the learning module may select the first letter of the typed word, and in block 258 use the received touch coordinates of the keystroke for that key to calculate new average keystroke coordinates for the selected key. In block 262, the learning module may calculate a new envelope of keystrokes about the average center point coordinates of that the selected key. As described more fully below with reference to FIG. 10, such updating of the key envelope parameters may involve a variety of statistical analyses to generate a touch location probability profile associated with each key. At block 264, the updated keypad layout data may be updated and stored in memory. In determination block 266, the learning module may determine whether there are more letters in the entered word to be analyzed, and if so, return to block 256 to select the next letter in the word. If all letters in the entered word have been analyzed (i.e., decision block 266="No"), the learning module 10 may return to block 242 to analyze the keystroke coordinates of the next word typed by the user.

Returning to determination block 250 of process 260, if the learning module 10 determines that the entered word was spelled incorrectly (i.e., decision block 250="No"), the learning module may determine whether the spelling error is due to a switch of adjacent letters on the virtual keyboard in determination block 252. This determination may involve comparing the typed word to the correctly spelled word to determine if swapping adjacent letters on the keyboard would correct the spelling error. If the spelling error is due to a mix up of letters adjacent to each other on the virtual keyboard, this may indicate an incorrect interpretation of the user's typing which may be due to the variability of the user's typing of the particular key or to a non-optimized keypad layout. Therefore, if the typographical error was due to a switch of adjacent keys (i.e., determination block 252="Yes"), in block 254 the learning module 10 may change the key designation associated with the received touch coordinates in order to correct the identified typographical error. The learning module may also analyze and update the keypad layout data for the corrected key designation executing blocks 256 through 266 as described above. Recognizing and correcting such common typing errors, and using the corrected key designation with the received touch coordinates to refine the keypad layout data enables the learning module 10 to recognize and accommodate the user's keystroke variability while the user is typing. By doing so, the learning module can improve the statistical keystroke envelopes defined for each key on the virtual keyboard consistent with the user's typing patterns.

If the spelling error is not from a switch between two adjacent letters (i.e., determination block 252="No"), this may indicate that the spelling error was a true spelling mistake and not due to a typographical error that could be avoided by refining the keypad layout data. Therefore, the analysis of the user's keystrokes may proceed based upon the recognized keys, such as by proceeding to execute the process described above with reference to blocks 256 through 266.

Figure 7:
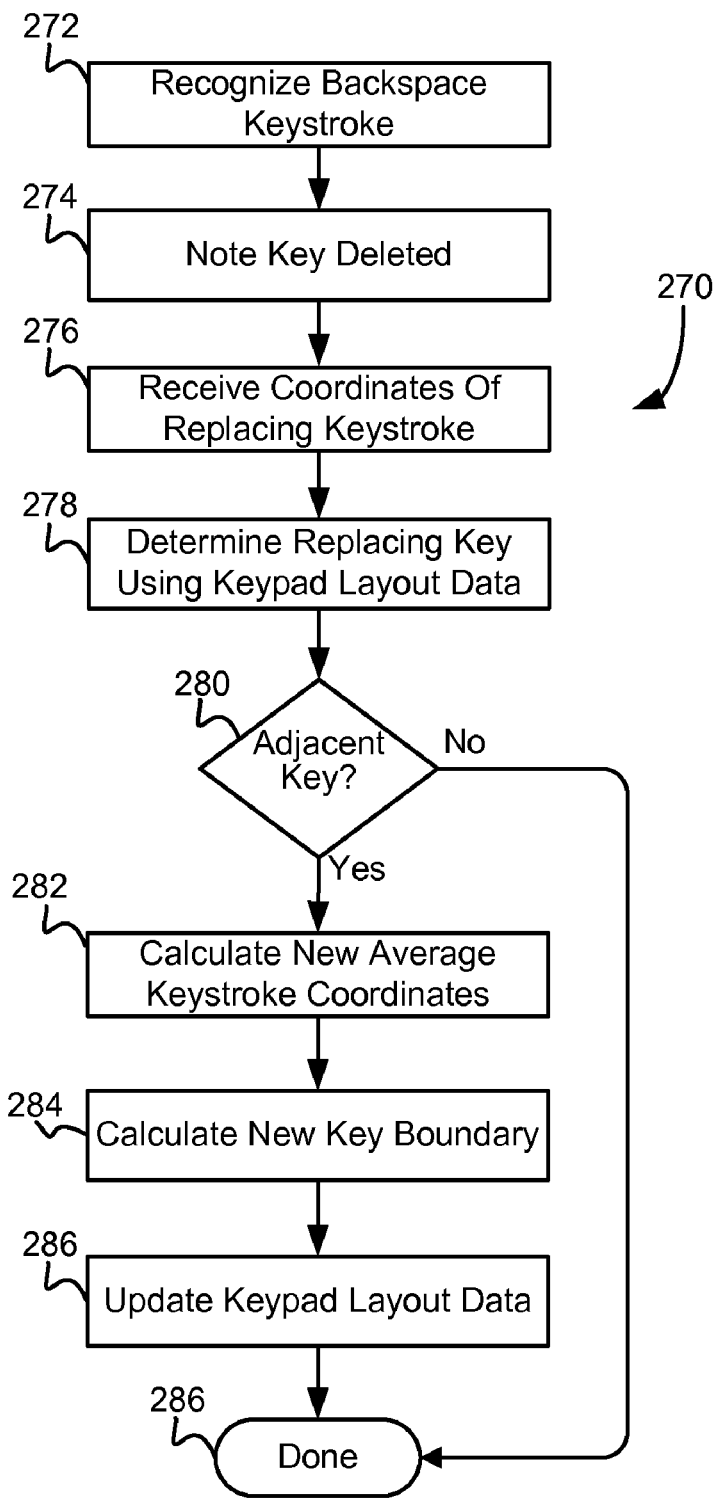
FIG. 7 is a process flow diagram illustrating an example learning routine for optimizing a virtual keypad layout based on typing corrections made by a user.

In another aspect, the learning module may be configured to recognize when a user makes corrections to typing in order to learn from such user corrections. FIG. 7 illustrates an example process 270 that may be implemented in a learning module 10 to learn from user typing corrections. In process 270 at block 272, the learning module 10 may receive an interrupt or signal from the computing device indicating when the user has pressed the "backspace" or "del" key. Since the press of these keys indicates that the user may be making a typing correction, at block 274 the learning module 10 may note the particular key that is deleted. If the user is deleting many keys in succession using the backspace key, the learning module 10 may note just the last key deleted. As part of this process, the learning module 10 may also access keystroke coordinates for the deleted key which in this aspect may be stored temporarily in memory, such as in a stack memory. By storing a limited number of keystroke coordinate values in temporary memory, the learning module 10 can learn from user typing corrections that occur typically while users are entering text on a keyboard. At block 276, the learning module 10 may receive the touch coordinates of a keystroke replacing the deleted key, and in block 278, determine the key replacing the deleted key, such as by comparing the received coordinates to the keypad layout data. At this point, the learning module 10 has the keystroke coordinate data associated with the deleted key, and has determined the replacement key that was intended by that particular keystroke. Since users correct typing for many reasons, and not just to correct typographical errors, at determination block 280, the learning module 10 may compare the deleted key to the replacement key to determine whether those two keys are adjacent to each other on the virtual keyboard. If the deleted and replacement keys are not adjacent to each other on the virtual keyboard (i.e., determination block 280="No"), this indicates that the correction is being made for a reason other than to correct a simple adjacent key typographical error, and accordingly the learning module process begun by recognizing a backspace keystroke in block 272 may be finished at block 288.

If the learning module determines that the deleted and replacement keys are adjacent on the virtual keyboard (i.e., determination block 280="Yes"), at block 282, the learning module 10 may calculate new average keystroke coordinates for of the replacement key using the original keystroke coordinates data. At block 284, the learning module 10 may also calculate a new statistical envelope for the replacement key. In other words, the learning module 10 recognizes a keystroke error has been made based upon the user correction of a particular key, and uses the entered keystroke coordinates to further optimize the keypad layout data. In block 286, the updated keypad layout data may be stored in memory, after which the learning module process begun by recognizing a backspace or delete key press in block 272 may be finished at block 288.

As mentioned above, the result of the learning module 10 receiving training inputs from a user and monitoring the user's typing may be keypad layout data that transforms the size, shape, location, and orientation of keys on a virtual keyboard to reflect the user's particular typing patterns. For example, the process may begin by displaying a default keyboard format as illustrated in FIG. 8 which the learning module 10 transforms into a user-specific customized virtual keyboard layout such as illustrated in FIG. 9. The example illustrated in FIGS. 8 and 9 is of QWERTY keyboard on a touchscreen display 320 of a mobile device which spans the two outside surfaces of the device which opens at a hinge 322. This design of a mobile device provides users with a near-full sized keyboard while the various aspects enable the virtual keyboard to adapt to the user's typing on the mobile device.

Figure 10:
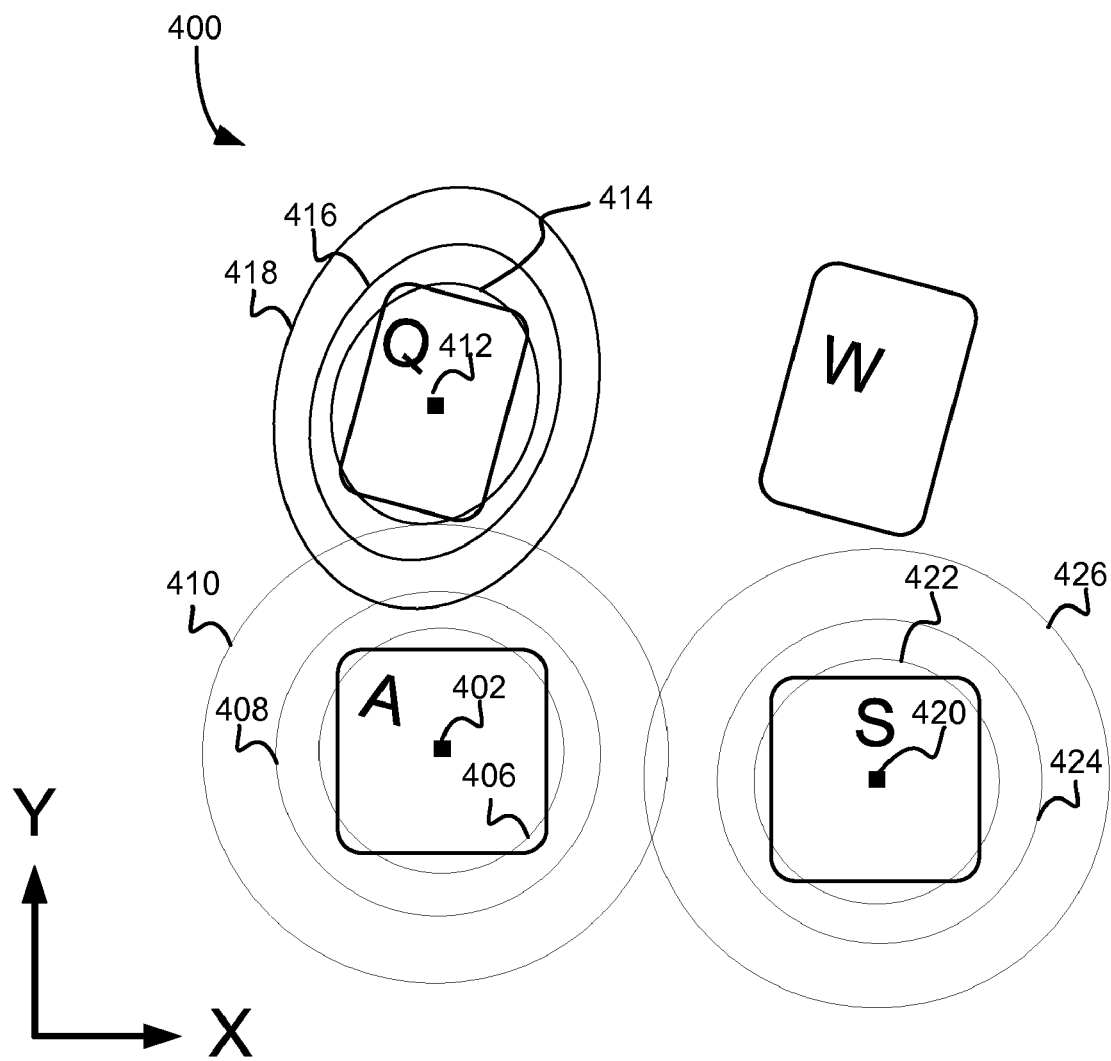
FIG. 10 is an illustration of keys of a virtual keyboard showing statistical envelopes surrounding key center points.

The individual key locations on a virtual keypad layout may be refined using various statistical analysis methods, such as calculating statistical envelopes or envelopes around virtual key center points as illustrated in FIG. 10. In FIG. 10 only a portion of a virtual keypad 440 is illustrated. Key locations may be specified on a virtual keyboard based upon center points, such as the "A" key center point 402, the "Q" key center point 412, and the "S" key center point 420. Such center points may be located within the geometry of a touch sensitive surface using "X-Y" coordinates or relative coordinates (e.g., key-to-key angle and distance offsets). The user's typing key-strike location variability may be reflected by statistically defined envelopes 406-410, 414-418, and 422-426 about the key center points. For example, an inner most envelope 406, 414, 422 may be defined around each key center point to encompass one standard deviation worth of key-strikes. Such an inner envelope may be defined encompassing the majority of key strike locations for a particular key. Thus, a key strike falling within this inner most envelope may be reliably interpreted as the key with the corresponding center point. As a further example, a second envelope 408, 416, 424 may be defined encompassing a larger percentage of key strike locations, such as those within two standard deviations of the center point. Such an envelope may be used to disambiguate a key strike that falls between center points. For example, if a key strike falls between center points 402 and 412 but within the two standard deviation envelope 408 of center point 402, the computing device may reliably interpret the key strike as corresponding to the "A" key at center point 402. A third (or more) envelop 410, 418, 426 may also be defined about key center points to further aid in disambiguating a key strike that falls between center points. For example, if a key strike falls between center points 402 and 412, and within the three standard deviation envelope 408 of center point 402 and envelope 418 of center point 412, the computing device may determine that another technique should be used to distinguish between these two keys (but not others), such as by using predictive text or spell checking algorithms that are well known in the art. For example, the keys struck before and/or after the uncertain key-strike may be evaluated against a database of known works to determine a likely intended letter for the ambiguous key-strike.

As described above with reference to FIGS. 6A-7, the envelopes 406-410, 414-418, and 422-426 may be calculated by statistically analyzing key strike locations during training sessions as well as during normal typing operations. While this process is described above in terms of standard deviation calculations, other statistical measures may be used to define appropriate envelopes about key center points.

Calculated key envelopes may further be used to define the size, shape, and orientation of virtual keys. For example, the statistical envelopes 414-418 about the "Q" key center point 412 are not circular, reflecting greater variability along one access than another. Further, the axis of symmetry of the envelopes is at an angle to the "Y" axis of the virtual keyboard 400. Reflecting this size, shape, and orientation of the user's key strikes for the "Q" key, the virtual key has been sized with a longer but narrower shape than the "A" and "S" keys, with the key's long axis at an angle to the "Y" axis. While FIG. 10 shows rectangular key shapes, key shapes may be circular, oval, triangular, asymmetrical, or other shapes as defined by the user's typing key strike patterns.

As previously noted, a virtual keypad layout may be stored in memory and associated with a user so that it may be retrieved by that user for use with a touch sensitive surface, such as a touchscreen or projection keyboard. This implementation allows users to use their virtual keyboards on any touch sensitive surface with access to the stored keypad layout data, such as via a network as illustrated in FIG. 11. Referring to FIG. 11, a central datastore 500 may be provided including a user record 504 that stores the user's virtual keypad layout data 506. For example, an Internet-accessible server may serve as a central server database repository of custom virtual keyboard layout data (referred to herein as a central datastore 500) on which many users can store their virtual keypad layout data 506. The user record 504 may include more than one virtual keypad layout data such as for different types of user interfaces and computing devices. For example, a user may have a virtual keypad layout data 506 corresponding to a particular mobile device 512. The user record 504 may be available to the mobile device 512 via a network 510, such as the Internet. To use a mobile device 512 having a touchscreen display 520, a user may connect to the Internet 510 to access the central datastore 500 and enter information sufficient to authenticate himself or herself to the central datastore 500. Once authenticated to the central datastore 500, the user may request a download of particular virtual keypad layout data 506 from the user's record 504. The requested virtual keypad layout data 506 may be transmitted to mobile device 512 via the Internet 510 and stored in a virtual keypad datastore 514. The mobile device 512 may then generate a virtual keyboard on the touchscreen 520 using the received virtual keypad layout data. In this manner, the virtual keypad configurations of the user may be made portable and accessible remotely.

While FIG. 11 shows an example implementation in which a user's virtual keyboard is ported to a mobile device 512, virtual keyboards may be implemented on any computing device with access to the user's virtual keypad layout data 506. Since the various aspects positioned virtual keys in locations customized for particular users, systems implementing such virtual keyboards may position keyboards at any location on a touch sensitive surface selected by the user. For example, large surfaces, such as desks, walls, large-screen displays, and white boards could be configured with touch detecting sensors to enable portions of such surfaces to serve as input devices for connected computing devices. Thus, computing devices implementing any of the various aspects that are coupled to a large touch sensitive surface may permit users to place their customized virtual keyboards at any location they desire. For example, a large-screen display configured to sense a user's touch that is coupled to a computing device may permit a user to place both hands on the surface at a location where the user desires his or her custom virtual keyboard to be presented. The computing device may recall the keypad layout data for the user's custom keyboard from memory, such as by accessing a central datastore 500 via a network 510, and use the layout data in combination with the user's finger touches to display the virtual keyboard at the desired location. In this manner, a user's virtual keyboard can be presented anywhere that a computing device can sense when a user touches a touch sensitive surface.

Figure 12A:
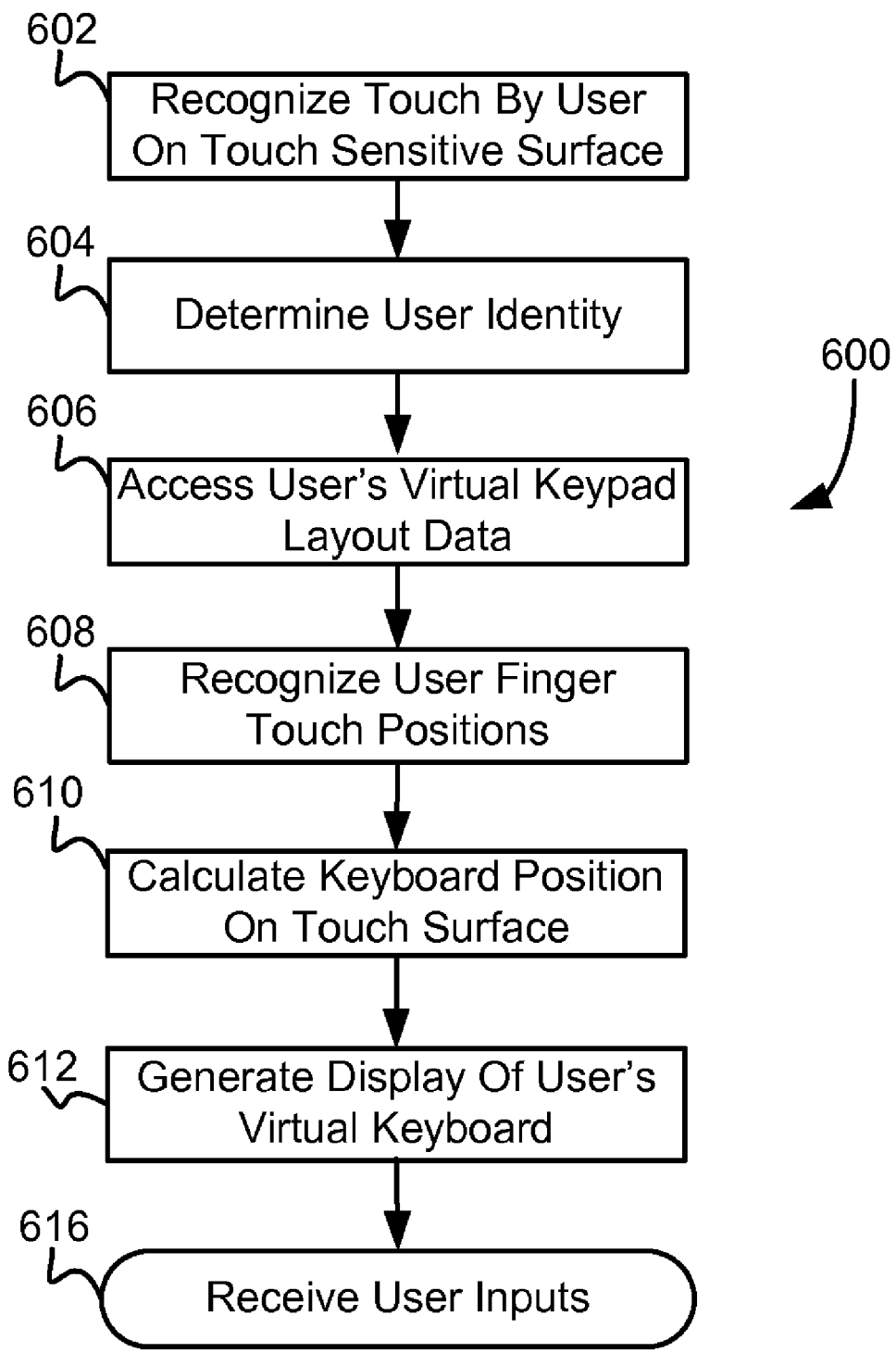
FIG. 12A is a process flow diagram of an example method for locating a custom virtual keyboard on a touch sensitive surface selected in response to touches by a user.

FIG. 12A illustrates an example process 600 by which a computing device may generate a virtual keyboard on a touch sensitive surface in response to user touches. In process 600 at block 602, a touch sensitive surface may recognize the touch of a user which may initiate the virtual keypad generating process. At block 604, the computing device coupled to the touch sensitive surface may determine the particular user's identity. This may be accomplished using any of a variety of known methods for identifying individuals to a computing device, including biometric methods, such as fingerprint recognition, voice print recognition, and hand or palm print recognition. A user may also identify himself or herself to the computing device by entering an identifier (e.g., a user name and password) into a presented default keyboard. At block 606, the computing device may use the user's identity to access a central database in which virtual keypad layout data is stored. Using the user's identity, the computing device may recall the virtual keypad layout data. At block 608, the computing device may also recognize the touch positions of the user's fingers on the touch sensitive surface. Users may be required to touch the touch sensitive surface in a particular manner in order to indicate a desired position for a keyboard on the surface. For example, a user may be required to lay ten fingers on the touch sensitive surface in the position that the user would like to see the space key and four base keys of each of the left and right hands. Alternatively, the user may be asked to touch the surface with both hands and with fingers stretched out flat in order to show the dimensions of the user's reach. In block 610, the computing device may use the recognized finger touch positions in combination with the user's virtual keypad layout data to calculate an appropriate virtual keyboard position on the touch sensitive surface. This calculation may take into account the dimensional limitations of the touch sensitive surface, such as positioning the virtual keyboard to fit within the available surface area. At block 612, the computing device uses the virtual keypad layout data to generate a display of the user's virtual keyboard in the desired location. At this point, the user is presented with his or her customized virtual keyboard in the desired location on the touch sensitive surface, and thereafter the user can begin typing inputs which, at block 614, the computing device may begin to receive and process.

In an aspect, measurements of a user's hands on a touch sensitive surface may be used to customize a default virtual keyboard. This process may be useful when a user first begins to interact with a system before a customized keypad layout has been generated. It also may be useful when a user prefers to use a default keypad but one sized to fit his or her hands. Also, this aspect may be useful when a user will not be using a particular computing device long enough to bother creating or downloading a fully customized virtual keyboard.

Figure 12B:
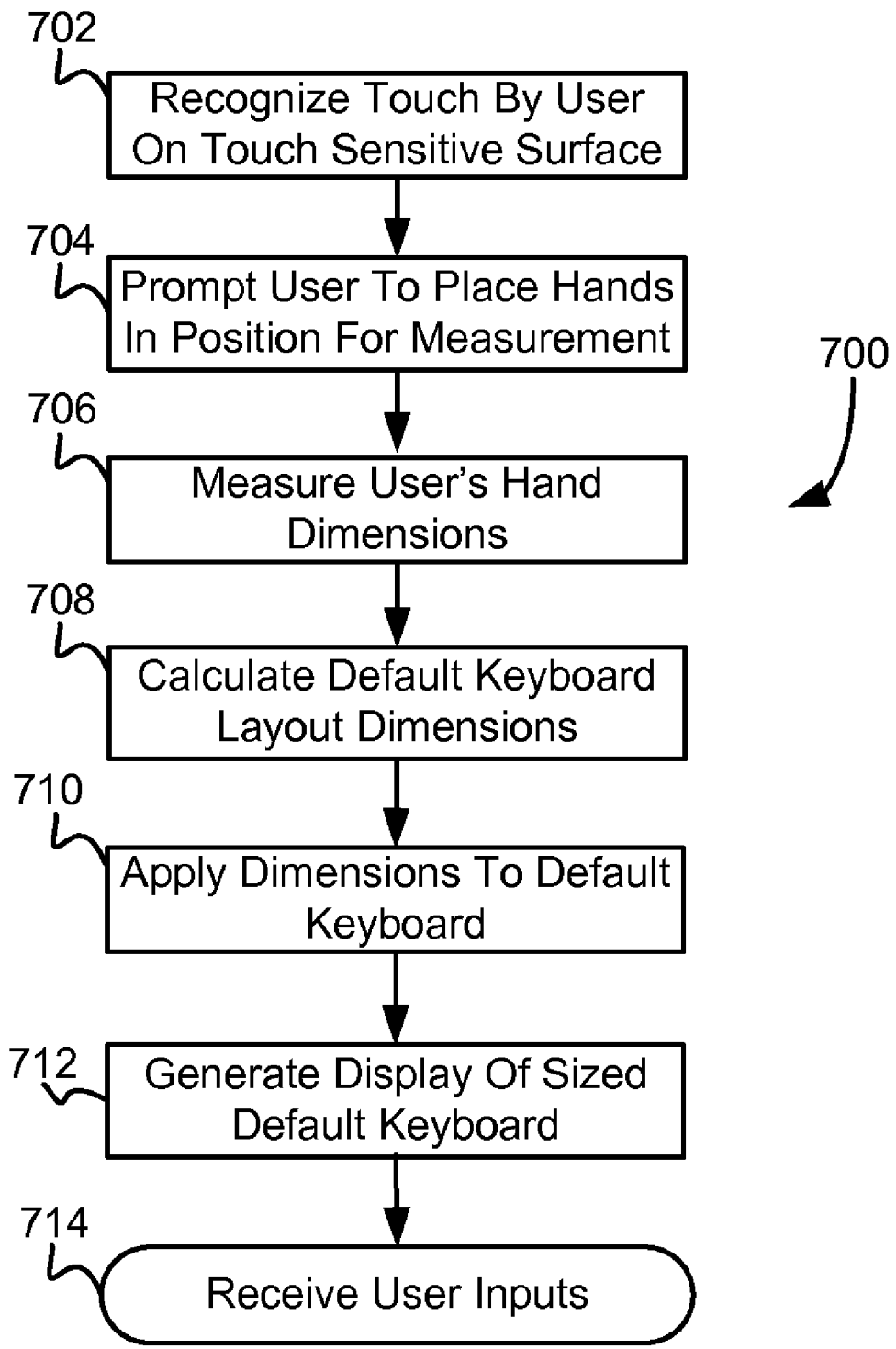
FIG. 12B is a process flow diagram of an example method for locating a default virtual keyboard on a touch sensitive surface sized in response to measuring dimensions of a user's hands.

FIG. 12B illustrates an example process 700 that may be implemented in this aspect too customize a default keyboard to a user's hand dimensions. In process 700 at block 702, a learning module 10 operating on a computing device may recognize the touch by a user on the touch sensitive surface to begin the process. If this is the start of the user's interaction with the computing device, at block 704, the learning module 10 may prompt the user to place his or her hands in a proper position for measurement. For example, the learning module may prompt the user to place both hands on the touch sensitive surface with fingers extended and thumbs touching. This hand position would enable the touch sensitive surface to measure the full span of the user's fingers. As another example, the learning module 10 may prompt the user to position his or her hands on the touch sensitive surface in the posture that the user intends to use while typing. At block 706, the learning module 10 may receive touch location information from the touch sensitive surface and use that information to measure the dimensions of the user's hands. Such measurements may focus on representative dimensions such as pinky-to-thumb distance and palm-to-index-finger-tip distance measurements. At block 708, the learning module 10 may use the hand dimension measurements to calculate the proper layout dimensions for a default keyboard. This process may involve scaling the default keyboard according to algorithms based upon ergonomic studies of average individuals. Alternatively, this process may involve calculating a scaling factor based upon a ratio of the measured hand dimensions to the average hand dimensions used to define the default keyboard layout, and then applying the scaling factor to the dimensions of the default keyboard layout. At block 710, the learning module 10 may apply the calculated dimensions to the default keyboard and, in block 712, generate a display of the properly sized default keyboard. At this point, the user has a customized virtual keyboard with which the user can begin to provide inputs to the computing device, which are received at block 714.

The aspects enabling portable virtual keyboards which may be displayed and used on a variety of computing devices may be very useful when a variety of structures and machines incorporate image projection and touch sensing capabilities. For example, users may someday be able to interact with the computer in their automobile by touching the windshield (or other surface) which includes an image projector and optical (or other) touch sensor system. In this example, when a user touches the automobile windshield, the automobile's computer senses the touch, recalls the user's virtual keyboard from memory, and projects the virtual keyboard onto the windshield in the location indicated by the user's touch.

The applications of such portable virtual keyboards are wide ranging, particularly when combined with the ability to store virtual keyboards in a central datastore 500 accessible by the Internet 510, such as illustrated in FIG. 11. In such aspects, users could have access to their personal virtual keyboards on any touch sensitive surface coupled to a computing device with access to the Internet through which the custom virtual keyboard database may be accessed.

As previously described, a user may interact with a virtual keypad on a touch sensitive surface using a variety of computing devices, including mobile devices. Typical mobile devices suitable for use with the various aspects will have in common the components illustrated in FIG. 13. For example, an exemplary mobile device 1300 may include a processor 1301 coupled to internal memory 1302 and a touchscreen display 1303. Additionally, the mobile device 1300 may have an antenna 1304 for sending and receiving electromagnetic radiation that is connected to a wireless data link and/or cellular telephone transceiver 1305 coupled to the processor 1301. In some implementations, the transceiver 1305 and portions of the processor 1301 and memory 1302 used for cellular telephone communications are collectively referred to as the air interface since it provides a data interface via a wireless data link. Mobile devices 1300 may also include a physical key pad 1306 or miniature keyboard and menu selection buttons or rocker switches 1307 for receiving user inputs.

The mobile processor 1301 may be any programmable microprocessor, microcomputer or multiple processor chip or chips that can be configured by software instructions (applications) to perform a variety of functions, including the functions of the various aspects described herein. In some mobile devices, multiple processors 1301 may be provided, such as one processor dedicated to wireless communication functions and one processor dedicated to running other applications. Typically, software applications may be stored in the internal memory 1302 before they are accessed and loaded into the processor 1301. In some mobile devices, additional memory chips (e.g., a Secure Data (SD) card) may be plugged into the device 1300 and coupled to the processor 1301. In many mobile devices, the internal memory 1302 may be a volatile or nonvolatile memory, such as flash memory, or a mixture of both. For the purposes of this description, a general reference to memory refers to all memory accessible by the processor 1301, including internal memory 1302, removable memory plugged into the mobile device, and memory within the processor 1301 itself.

Figure 14:
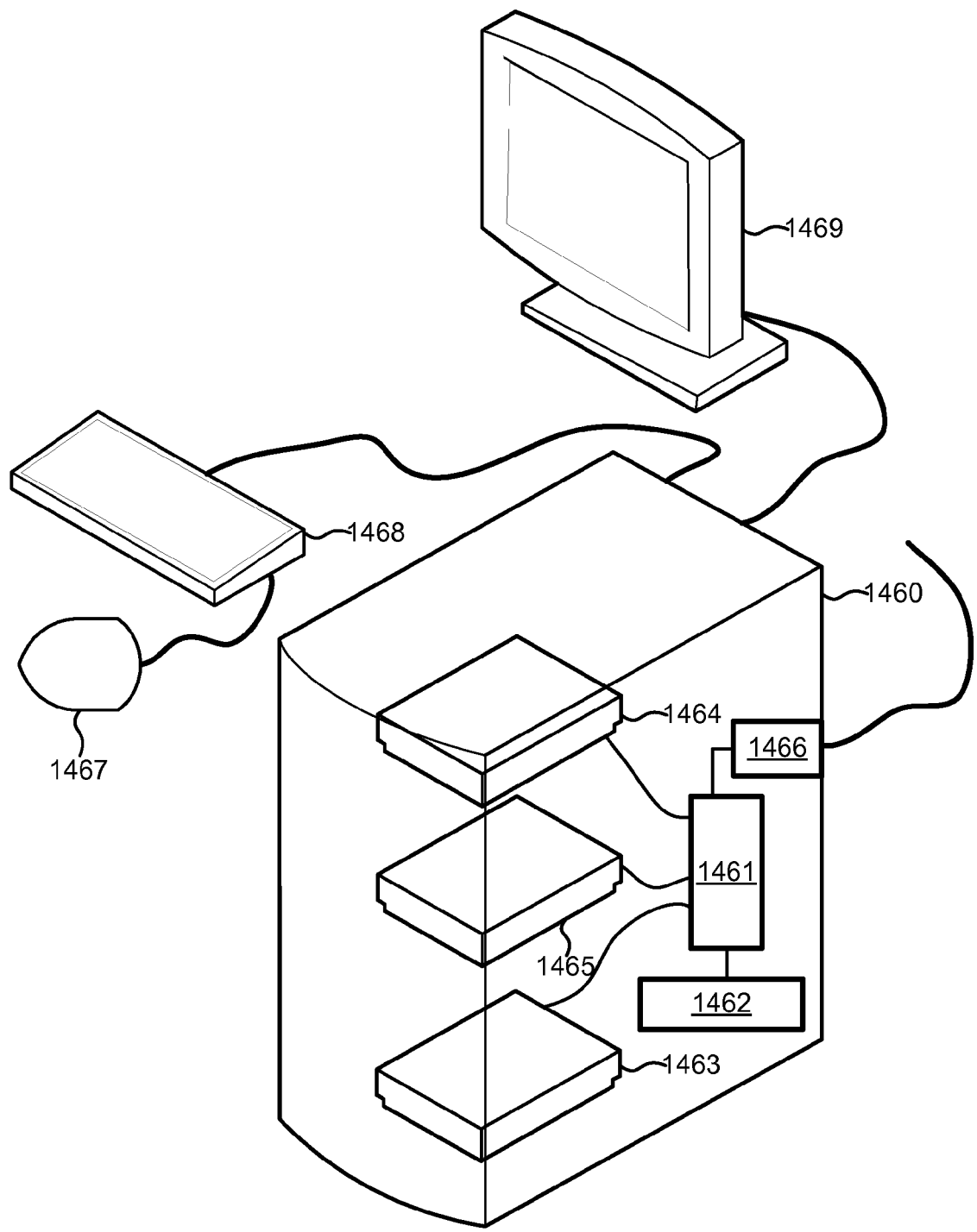
FIG. 14 is a component block diagram illustrating example components of a computer suitable for use in the various aspects.

The aspects described above may also be implemented on any of a variety of computing devices, such as a personal computer 1460 illustrated in FIG. 14. Such a personal computer 1460 typically includes a processor 1461 coupled to volatile memory 1462 and a large capacity nonvolatile memory, such as a disk drive 1463. The computer 1460 may also include a floppy disc drive 1464 and a compact disc (CD) drive 1465 coupled to the processor 1461. Typically the computer device 1460 will also include a pointing device such as a mouse 1467 and a display 1469, may include a user input device such as a touchscreen 1468 or other touch sensitive surface. The computer device 1460 may also include a number of connector ports coupled to the processor 1461 for establishing data connections or receiving external memory devices, such as a USB or FireWire® connector sockets or other network connection circuits 1466 for coupling the processor 1461 to a network. In a notebook configuration, the computer housing includes the pointing device 1467, touchscreen 1468 and the display 1469 as is well known in the computer arts.

Figure 15:
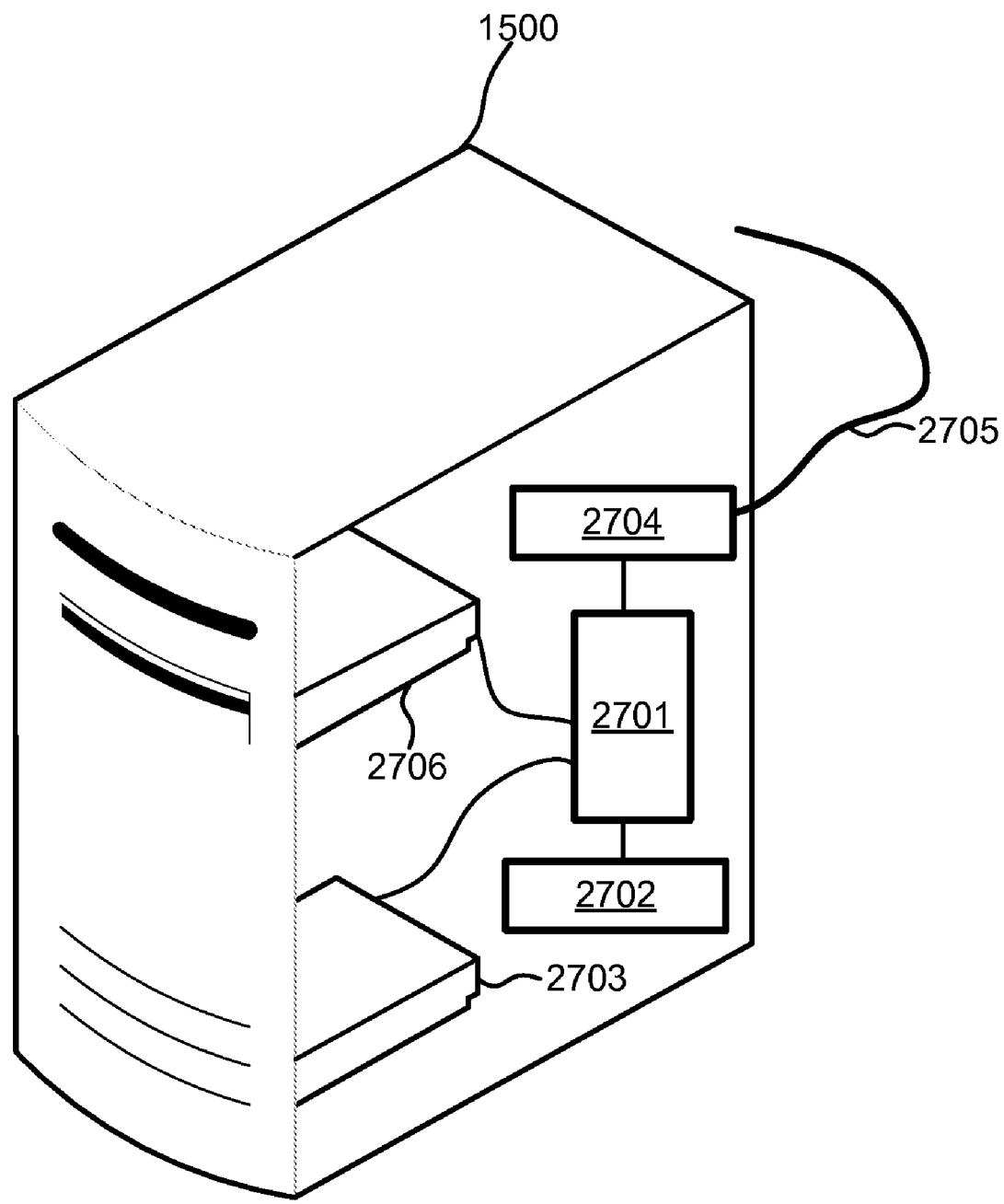
FIG. 15 is a component block diagram illustrating example components of a server suitable for use in the various aspects.

A number of the aspects described above may also be implemented with any of a variety of remote server devices, such as the server 1500 illustrated in FIG. 15. Such a server 1500 typically includes a processor 1501 coupled to volatile memory 1502 and a large capacity nonvolatile memory, such as a disk drive 1503. The server 1500 may also include a floppy disc drive and/or a compact disc (CD) drive 1506 coupled to the processor 1501. The server 1500 may also include a number of connector ports 1504 coupled to the processor 1500 for establishing data connections with network circuits 1505.

While the foregoing example descriptions involve a single computing device operating with a single touch sensitive surface, the aspects and the claims apply equally to multi-processor and multiple computer implementations, as well as computing devices coupled to multiple touch sensitive surfaces. Also, the aspects and the claims apply equally to implementations that generate more than one virtual keypad on one or more touch sensitive surfaces. Further, the aspects and the claims encompass an implementation in which two customized virtual keypads are generated one or two touch sensitive surfaces so that two users can interact with a computing device at the same time, such as in a two-player video game. For example, a computing device could be coupled to a touch sensitive window (e.g., a store front window) on which a projector creates displays of two customized virtual keypads (e.g., game controllers or joysticks in this example) and a game display so that two users can play a video game against each other by touching the window. In this example, the users may interface with the computing device via customized virtual keypads that are accessed from a central database or computing "cloud." Thus, the users may have use of customized joysticks or game controller pads that include the action buttons where they prefer and their use indicates the buttons should be positioned.

The foregoing method descriptions and process flow diagrams are provided merely as illustrative examples and are not intended to require or imply that the steps of the various aspects must be performed in the order presented. As will be appreciated by one of skill in the art the order of steps in the foregoing aspects may be performed in any order. Further, references to step identifiers and words such as "thereafter," "then," "next," etc. are not intended to limit the order of the steps; such identifiers and words are simply used to guide the reader through the description of the methods.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for defining a keypad on a touch sensitive surface, comprising:
   receiving a series of coordinates of a series of user touches on the touch sensitive surface;
   correlating a plurality of keys with the received series of coordinates;
   determining an average of received coordinates correlated with each of the plurality of keys, wherein determining the average of received coordinates correlated with each of the plurality of keys comprises:
      calculating a variability of key-strike locations for each of the plurality of keys;
      determining when the calculated variability of key-strike locations for each of the plurality of keys has plateaued; and
      calculating an average of coordinate key strike locations for each of the plurality of keys once the variability of key strike locations has plateaued;
   saving the calculated average coordinates for each of the plurality of keys in keypad layout data; and
   generating an image of a virtual keypad using the keypad layout data.

2. The method of claim 1, further comprising:
   prompting the user to enter a series of keystrokes,
   wherein correlating a plurality of keys with the received series of coordinates comprises correlating the prompted series of keystrokes with the received coordinates.

3. The method of claim 1, further comprising:
   determining a statistical envelope based upon received coordinates for each of the plurality of keys by calculating standard deviations about the calculated average coordinates for each of the plurality of keys; and
   saving the statistical envelope for each of the plurality of keys in the keypad layout data.

4. The method of claim 3, wherein generating an image of the virtual keypad using the keypad layout data further comprises:
   generating images of the plurality of keys in the virtual keypad in which a size of each key image is based upon the statistical envelope for each of the plurality of keys in the keypad layout data.

5. The method of claim 3, further comprising:
   determining a first standard deviation envelope of key strike locations about the calculated average coordinates for each of the plurality of keys; and
   interpreting a key strike as intended for a selected key in response to the key strike occurring within the first standard deviation envelope for the selected key.

6. The method of claim 5, further comprising:
   determining a second standard deviation envelope of key strike locations about the calculated average coordinates for each of the plurality of keys;
   determining when a key strike location is between and outside of respective first standard deviation envelopes for a first key and a second key; and
   interpreting the key strike as intended for the first key in response to the key strike location being within the second standard deviation envelope of the first key and outside the second deviation envelop of the second key.

7. The method of claim 1, wherein generating an image of the virtual keypad using the keypad layout data comprises:
   generating images of keys in the virtual keypad in locations based upon the average coordinates of each of the plurality of keys stored in the keypad layout data.

8. The method of claim 1, further comprising:
   monitoring typing on the virtual keypad on the touch sensitive surface;
   identifying an adjacent key typing error;
   determining a correct key associated with the adjacent key typing error;
   updating the average coordinate for the correct key based upon received coordinates for the typed keystroke; and
   saving the updated average coordinate with the correct key in the keypad layout data.

9. The method of claim 8, wherein identifying an adjacent key typing error comprises:
   recognizing a misspelled word; and
   determining whether the misspelling involves a switch of two keys that are adjacent to each other in the virtual keypad.

10. The method of claim 8, wherein identifying an adjacent key typing error comprises:
    recognizing a user correction of a letter associated with a key; and
    determining whether the user correction involves a switch of two keys that are adjacent to each other in the virtual keypad.

11. The method of claim 8, wherein identifying an adjacent key typing error comprises:
   prompting the user to type a specified phrase over a number of cycles;
   recognizing a mistyped character based upon the specified phrase; and
   determining whether the mistyped character involves a switch of two keys that are adjacent to each other in the virtual keypad.

12. The method of claim 1, wherein the keypad layout data is saved in a network accessible database, the method further comprising:
   transmitting the keypad layout data to a computing device via the network,
   wherein generating an image of a virtual keypad using the keypad layout data comprises generating the image of the virtual keypad on a touch sensitive surface coupled to the computing device.

13. The method of claim 12, further comprising:
   receiving a user touch on the touch sensitive surface coupled to the computing device; and
   determining a location on the touch sensitive surface for display of the virtual keypad based upon the received user touch on the touch sensitive surface,
   wherein generating an image of a virtual keypad using the keypad layout data comprises generating the image at the determined location on the touch sensitive surface for display.

14. The method of claim 1, further comprising:
   receiving a user input to select and move a key relative to another key; and
   adjusting layout dimensions of the generated image of the virtual keypad based upon the user input and generating another image of the virtual keypad.

15. The method of claim 1, wherein determining the variability of key-strike location for each key further comprises:
   determining key-strike speed; and
   determining a key-strike error rate.

16. The method of claim 1, further comprising:
   prompting the user to rest palms on the touch sensitive surface; and
   distinguishing keystrokes from the user resting palms on the touch sensitive surface.

17. A computing device, comprising:
   a processor;
   memory coupled to the processor; and
   a touch sensitive surface coupled to the processor,
   wherein the processor is configured with processor-executable instructions to perform processes comprising:
      receiving a series of coordinates of a series of user touches on the touch sensitive surface;
      correlating a plurality of keys with the received series of coordinates;
      determining an average of received coordinates correlated with each of the plurality of keys, wherein determining the average of received coordinates correlated with each of the plurality of keys comprises:
         calculating a variability of key-strike locations for each of the plurality of keys;
         determining when the calculated variability of key-strike locations for each of the plurality of keys has plateaued; and
         calculating an average of coordinate key strike locations for each of the plurality of keys once the variability of key strike locations has plateaued;
      saving the calculated average coordinates for each of the plurality of keys in keypad layout data; and
      generating an image of a virtual keypad using the keypad layout data.

18. The computing device of claim 17, wherein the processor is configured with processor-executable instructions to perform further processes comprising:
   prompting the user to enter a series of keystrokes,
   wherein correlating a plurality of keys with the received series of coordinates comprises correlating the prompted series of keystrokes with the received coordinates.

19. The computing device of claim 17, wherein the processor is configured with processor-executable instructions to perform further processes comprising:
   determining a statistical envelope based upon received coordinates for each of the plurality of keys by calculating standard deviations about the calculated average coordinates for each of the plurality of keys; and
   saving the statistical envelope for each of the plurality of keys in the keypad layout data.

20. The computing device of claim 19, wherein the processor is configured with processor-executable instructions such that generating an image of the virtual keypad using the keypad layout data further comprises:
   generating images of the plurality of keys in the virtual keypad in which a size of each key image is based upon the statistical envelope for each of the plurality of keys in the keypad layout data.

21. The computing device of claim 17, wherein the processor is configured with processor-executable instructions such that generating an image of the virtual keypad using the keypad layout data comprises:
   generating images of keys in the virtual keypad in locations based upon the average coordinates of each of the plurality of keys stored in the keypad layout data.

22. The computing device of claim 17, wherein the processor is configured with processor-executable instructions to perform further processes comprising:
   monitoring typing on the virtual keypad on the touch sensitive surface;
   identifying an adjacent key typing error;
   determining a correct key associated with the adjacent key typing error;
   updating the average coordinate for the correct key based upon received coordinates for the typed keystroke; and
   saving the updated average coordinate with the correct key in the keypad layout data.

23. The computing device of claim 22, wherein the processor is configured with processor-executable instructions such that identifying an adjacent key typing error comprises:
   recognizing a misspelled word; and determining whether the misspelling involves a switch of two keys that are adjacent to each other in the virtual keypad.

24. The computing device of claim 22, wherein the processor is configured with processor-executable instructions such that identifying an adjacent key typing error comprises:
   recognizing a user correction of a letter associated with a key; and
   determining whether the user correction involves a switch of two keys that are adjacent to each other in the virtual keypad.

25. The computing device of claim 17, wherein the keypad layout data is saved in a network accessible database, wherein the processor is configured with processor-executable instructions to perform further processes comprising:
   receiving the keypad layout data from the network accessible database via the network.

26. The computing device of claim 25, wherein the processor is configured with processor-executable instructions to perform further processes comprising:
  receiving a user touch on the touch sensitive surface coupled to the computing device;
  determining a location on the touch sensitive surface for display of the virtual keypad based upon the received user touch on the touch sensitive surface; and
  generating the image of the virtual keypad using the keypad layout data at the determined location on the touch sensitive surface for display.

27. The computing device of claim 17,
  wherein the processor is configured with processor-executable instructions to perform processes further comprising:
  receiving a user input to select and move a key relative to another key; and
  adjusting layout dimensions of the generated image of the virtual keypad based upon the user input and generating another image of the virtual keypad.

28. A computing device coupled to a touch sensitive surface, comprising:
  means for receiving a series of coordinates of a series of user touches on the touch sensitive surface;
  means for correlating a plurality of keys with the received series of coordinates;
  means for determining an average of received coordinates correlated with each of the plurality of keys, wherein the means for determining the average of received coordinates correlated with each of the plurality of keys comprises:
    means for calculating a variability of key-strike locations for each of the plurality of keys;
    means for determining when the calculated variability of key-strike locations for each of the plurality of keys has plateaued; and
    means for calculating an average of coordinate key strike locations for each of the plurality of keys once the variability of key strike locations has plateaued;
  means for saving the calculated average coordinates for each of the plurality of keys in keypad layout data; and
  means for generating an image of a virtual keypad using the keypad layout data.

29. The computing device of claim 28, further comprising:
  means for prompting the user to enter a series of keystrokes,
  wherein means for correlating a plurality of keys with the received series of coordinates comprises means for correlating the prompted series of keystrokes with the received coordinates.

30. The computing device of claim 28, further comprising:
  means for determining a statistical envelope based upon received coordinates for each of the plurality of keys by calculating standard deviations about the calculated average coordinates for each of the plurality of keys; and
  means for saving the statistical envelope for each of the plurality of keys in the keypad layout data.

31. The computing device of claim 30, wherein means for generating an image of the virtual keypad using the keypad layout data further comprises:
  means for generating images of the plurality of keys in the virtual keypad in which a size of each key image is based upon the statistical envelope for each of the plurality of keys in the keypad layout data.

32. The computing device of claim 28, wherein means for generating an image of the virtual keypad using the keypad layout data comprises:
  means for generating images of keys in the virtual keypad in locations based upon the average coordinates of each of the plurality of keys stored in the keypad layout data.

33. The computing device of claim 28, further comprising:
  means for monitoring typing on the virtual keypad on the touch sensitive surface;
  means for identifying an adjacent key typing error;
  means for determining a correct key associated with the adjacent key typing error;
  means for updating the average coordinate for the correct key based upon received coordinates for the typed keystroke; and
  means for saving the updated average coordinate with the correct key in the keypad layout data.

34. The computing device of claim 33, wherein means for identifying an adjacent key typing error comprises:
  means for recognizing a misspelled word; and means for determining whether the misspelling involves a switch of two keys that are adjacent to each other in the virtual keypad.

35. The computing device of claim 33, wherein means for identifying an adjacent key typing error comprises:
  means for recognizing a user correction of a letter associated with a key; and
  means for determining whether the user correction involves a switch of two keys that are adjacent to each other in the virtual keypad.

36. The computing device of claim 28, wherein the keypad layout data is saved in a network accessible database, the computing device further comprising:
  means for transmitting the keypad layout data to a computing device via the network,
  wherein means for generating an image of a virtual keypad using the keypad layout data comprises means for generating the image of the virtual keypad on a touch sensitive surface coupled to the computing device.

37. The computing device of claim 36, further comprising:
  means for receiving a user touch on the touch sensitive surface coupled to the computing device; and
  means for determining a location on the touch sensitive surface for display of the virtual keypad based upon the received user touch on the touch sensitive surface,
  wherein means for generating an image of a virtual keypad using the keypad layout data comprises means for generating the image at the determined location on the touch sensitive surface for display.

38. The computing device of claim 28, further comprising:
  means for receiving a user input to select and move a key relative to another key; and
  means for adjusting layout dimensions of the generated image of the virtual keypad based upon the user input and generating another image of the virtual keypad.

39. A non-transitory, computer-readable medium having stored thereon processor-executable instructions configured to cause a processor to perform operations, comprising:
  receiving a series of coordinates of a series of user touches on the touch sensitive surface;
  correlating a plurality of keys with the received series of coordinates;
  determining an average of received coordinates correlated with each of the plurality of keys, wherein determining the average of received coordinates correlated with each of the plurality of keys comprises:
    calculating a variability of key-strike locations for each of the plurality of keys;

determining when the calculated variability of keystrike locations for each of the plurality of keys has plateaued; and calculating an average of coordinate key strike locations for each of the plurality of keys once the variability of key strike locations has plateaued;

saving the calculated average coordinates for each of the plurality of keys in keypad layout data; and generating an image of a virtual keypad using the keypad layout data.

40. The non-transitory computer-readable medium of claim 39, wherein the stored processor-executable instructions are configured to cause the processor to perform operations further comprising:

prompting the user to enter a series of keystrokes, correlating the prompted series of keystrokes with the received coordinates.

41. The non-transitory computer-readable medium of claim 39, wherein the stored processor-executable instructions are configured to cause the processor to perform operations further comprising:

determining a statistical envelope based upon received coordinates for each of the plurality of keys by calculating standard deviations about the calculated average coordinates for each of the plurality of keys; and saving the statistical envelope for each of the plurality of keys in the keypad layout data.

42. The non-transitory computer-readable medium of claim 41, wherein the stored processor-executable instructions configured to cause the processor to generate an image of the virtual keypad using the keypad layout data using the keypad layout data cause the processor to perform operations further comprising:

generating images of the plurality of keys in the virtual keypad in which a size of each key image is based upon the statistical envelope for each of the plurality of keys in the keypad layout data.

43. The non-transitory computer-readable medium of claim 39, wherein the stored processor-executable instructions configured to cause the processor to generate an image of the virtual keypad using the keypad layout data using the keypad layout data cause the processor to perform operations further comprising:

generating images of keys in the virtual keypad in locations based upon the average coordinates of each of the plurality of keys stored in the keypad layout data.

44. The non-transitory computer-readable medium of claim 39, wherein the stored processor-executable instructions are configured to cause the processor to perform operations further comprising:

monitoring typing on the virtual keypad on the touch sensitive surface;

identifying an adjacent key typing error;

determining a correct key associated with the adjacent key typing error;

updating the average coordinate for the correct key based upon received coordinates for the typed keystroke; and saving the updated average coordinates with the correct key in the keypad layout data.

45. The non-transitory computer-readable medium of claim 44, wherein the stored processor-executable instructions configured to cause the processor to identify an adjacent key typing error cause the processor to perform operations further comprising:

recognizing a misspelled word; and determining whether the misspelling involves a switch of two keys that are adjacent to each other in the virtual keypad.

46. The non-transitory computer-readable medium of claim 44, wherein the stored processor-executable instructions configured to cause the processor to identify an adjacent key typing error cause the processor to perform operations further comprising:

recognizing a user correction of a letter associated with a key; and determining whether the user correction involves a switch of two keys that are adjacent to each other in the virtual keypad.

47. The non-transitory computer-readable medium of claim 39, wherein the keypad layout data is saved in a network accessible database, and wherein the stored processor-executable instructions cause the processor to perform operations further comprising:

transmitting the keypad layout data to a computing device via the network, generating an image of a virtual keypad using the keypad layout data on a touch sensitive surface coupled to the computing device.

48. The non-transitory computer-readable medium of claim 37, wherein the stored processor-executable instructions are configured to cause the processor to perform operations further comprising:

receiving a user touch on the touch sensitive surface coupled to the computing device;

determining a location on the touch sensitive surface for display of the virtual keypad based upon the received user touch on the touch sensitive surface;

wherein the stored processor-executable instructions configured to cause the processor to generate an image of the virtual keypad using the keypad layout data are configured to cause the processor to perform operations:

generating the image at the determined location on the touch sensitive surface for display.

49. The non-transitory, computer-readable medium of claim 39, wherein the stored thereon processor-executable instructions are configured to cause a processor to perform operations further comprising:

receiving a user input to select and move a key relative to another key; and adjusting layout dimensions of the generated image of the virtual keypad based upon the user input and generating another image of the virtual keypad.

\* \* \* \* \*